(12) United States Patent
Batoukov et al.

(10) Patent No.: US 11,921,609 B2
(45) Date of Patent: *Mar. 5, 2024

(54) DATA ANOMALY DETECTION

(71) Applicant: Microsoft Technology Licensing, LLC, Redmond, WA (US)

(72) Inventors: Roman Batoukov, Redmond, WA (US); Richard Wydrowski, Bellevue, WA (US); Sai Sankalp Arrabolu, Kirkland, WA (US); Zeqiang Wang, Redmond, WA (US); Lech Gudalewicz, Sammamish, WA (US); Keiji Kanazawa, Seattle, WA (US); Benjamin J. Lofton, Seattle, WA (US); Thomas W. Potthast, Sammamish, WA (US); Suren Aghajanyan, Bellevue, WA (US); Khoa Tran, Redmond, WA (US); Jian Zhang, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,620

(22) Filed: May 13, 2022

(65) Prior Publication Data

US 2022/0269908 A1 Aug. 25, 2022

(51) Int. Cl.
*G06F 11/34* (2006.01)
*G06F 3/04855* (2022.01)
*G06F 9/54* (2006.01)
*G06F 11/07* (2006.01)
*G06F 18/21* (2023.01)
*G06F 18/214* (2023.01)
*G06N 20/00* (2019.01)

(52) U.S. Cl.
CPC ...... *G06F 11/3447* (2013.01); *G06F 3/04855* (2013.01); *G06F 9/542* (2013.01); *G06F 11/0709* (2013.01); *G06F 11/0781* (2013.01); *G06F 11/0793* (2013.01); *G06F 18/2148* (2023.01); *G06F 18/2178* (2023.01); *G06N 20/00* (2019.01)

(58) Field of Classification Search
None
See application file for complete search history.

(56) References Cited

U.S. PATENT DOCUMENTS 10,459,827 B1 * 10/2019 Aghdaie ............. G06F 11/0751

* cited by examiner

*Primary Examiner* — Syed A Roni
(74) *Attorney, Agent, or Firm* — Barta Jones, PLLC

(57) ABSTRACT

Systems and methods for data anomaly detection include recommending one or more algorithms from a set of algorithms to process received time series data, wherein the one or more algorithms are recommended based at least in part on a type of workload for processing the received time series data. Assisted parameter tuning is provided for a detected anomaly alert and calibration, and the received time series data is processed based on a user selected algorithm that is parameter tuned.

17 Claims, 15 Drawing Sheets

DATA ANOMALY DETECTION

CROSS-REFERENCE TO RELATED APPLICATION

This nonprovisional application is a continuation of and claims priority to U.S. Non Provisional application Ser. No. 16/247,554, entitled "Data Anomaly Detection," filed Jan. 14, 2019, issued as U.S. Pat. No. 11,341,374 on May 24, 2022, which claims priority to U.S. Provisional Application No. 62/677,637, entitled "Data Anomaly Detection", filed May 29, 2018, which are both incorporated by reference herein in their entireties.

BACKGROUND

Service unavailability caused by system loss can have many different adverse effects, such as revenue loss. For example, as the time-to-detect and time-to-mitigate the system loss increases, the potential adverse effects increase. Moreover, there can be engineering efficiency losses caused by noise in alerts. That is, without accurate detection and mitigation of system loss, efficiency losses can also result.

Technical challenges exist with detecting and mitigating system loss, including, but not limited to, difficulty in setting up accurate alerts (e.g., the lack of a silver bullet for all types of workload and the scale of the monitoring—such as 700M+ metrics to monitor and 450K+ alerts) and the confidence and clarity in alerts (e.g., signal to noise ratio and silo view of the system).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods for data anomaly detection include defining one or more anomaly alerts that are tuned based on a user input received at a user input sensitivity element. The user input sensitivity element is adjustable to define a sensitivity for one or more algorithms of a plurality of anomaly detection algorithms to change a corresponding sensitivity mapping by automatically changing one or more parameters for the one or more algorithms. Anomaly detection results of a change to the user input sensitivity element are displayed. One or more algorithms of the plurality of anomaly detection algorithms are recommended to process time series data to detect one or more anomalies. The plurality of anomaly detection algorithms are trained in part using iterative learning using feedback including data relating to user input of previous selections of one or more algorithms of the plurality of anomaly detection algorithms. User feedback is received and one or more algorithms of the plurality of anomaly detection algorithms are calibrated based at least in part on the received user feedback. The received user feedback includes labeled data used to train the one or more algorithms using machine learning.

Many of the attendant features will be more readily appreciated as the same becomes better understood by reference to the following detailed description considered in connection with the accompanying drawings.

BRIEF DESCRIPTION OF THE DRAWINGS

Corresponding reference characters indicate corresponding parts throughout the drawings.

DETAILED DESCRIPTION

The computing devices and methods described herein perform anomaly detection and diagnosis, particularly online time series anomaly detection for time series data at scale. One or more trained anomaly detection algorithms are recommended and/or selected to perform the detection and allow for user input to adjust sensitivity settings for the detection. For example, automatic algorithm recommendation and assisted parameter tuning for anomaly detection allow for a more efficient and improved user experience with a simplified user interface.

One or more examples leverage a set of algorithms, each of which targets a different type of workload. With the algorithm recommendation and assisted parameter tuning, the alert setup and calibration experience is made simpler and easier for users, such as engineers, who might not have data science background. Diagnosis tools also facilitate post-detection investigation. In addition, alert annotation support enables users to provide feedback to alerts received and can be used as labeled data to retrain the algorithms. As a result, detection accuracy is improved over iterations of learning.

Configurations of the present disclosure thereby reduce service unavailability caused by system loss (e.g., alert on web service outages earlier), resulting in improved overall system performance and reduced adverse effects, which can save time and cost. Various examples provide more efficient and reliable anomaly detection and diagnosis. In this manner, when a processor is programmed to perform the operations described herein, the processor is used in an unconventional way, and allows the more efficient detection and diagnosis of anomalies that could otherwise result in system loss.

Various examples perform online anomaly detection and use machine learning algorithms for detection. The various examples can provide an integrated solution with different platforms, such as with the Microsoft® Asimov data platform, and include alert setup and calibration and diagnosis tools (e.g., machine outlier detection, anomaly temporal correction, and needle in the haystack investigation).

Some examples are implemented in a Universal Store application. In a Universal Store, every single minute of system downtime can potentially lead to revenue loss. Without the present disclosure, it is hard for users (e.g., engineers) to define alert thresholds accurately because of the diversity of workload and volume of metrics to monitor. Inaccurate alerts cost delay in Time-To-Detection (TTD) and Time-To-Mitigation (TTM) and more engineering resources to investigate.

A system for anomaly detection in some examples can be implemented as a software application, components or modules, such as computer-executable software instructions that are executable with a processing system. The applications can be stored on computer-readable storage memory (e.g., memory), such as any suitable memory device or electronic data storage.

Figure 1:
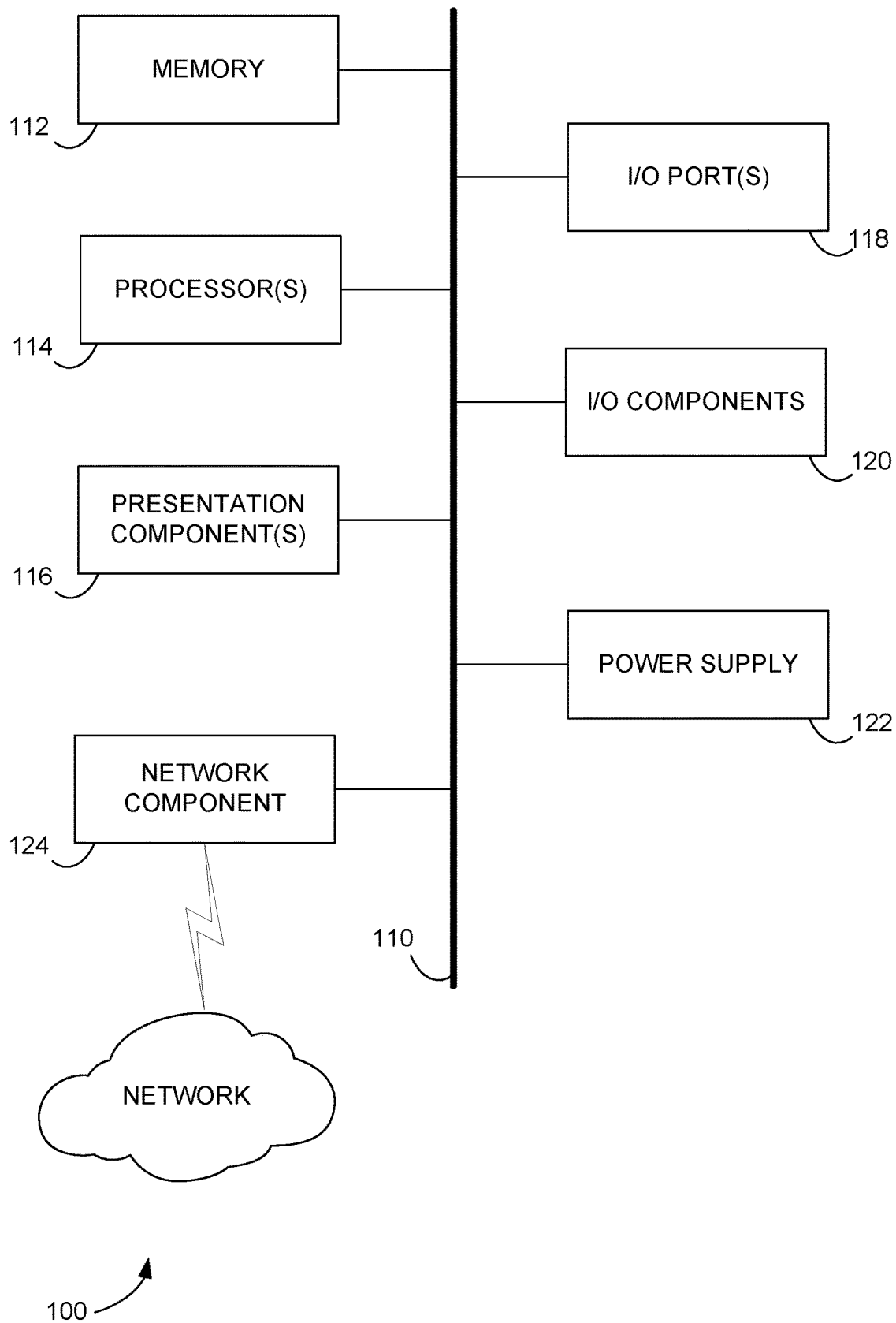
FIG. 1 is a block diagram of an example computing environment suitable for implementing various examples disclosed herein.

FIG. 1 is a block diagram of an example computing device 100 for implementing aspects disclosed herein and is designated generally as the computing device 100. The computing device 100 is but one example of a suitable computing environment and is not intended to suggest any limitation as to the scope of use or functionality of various embodiments. Neither should the computing device 100 be interpreted as having any dependency or requirement relating to any one or combination of components and/or modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples can be practiced in a variety of system configurations, including personal computers, laptops, smart phones, mobile tablets, hand-held devices, consumer electronics, specialty computing devices, etc. The disclosed examples can also be practiced in distributed computing environments, such as those disclosed in FIG. 2 described in more detail below, where tasks are performed by remote-processing devices that are linked through a communications network.

The computing device 100 includes a bus 110 that directly or indirectly couples the following devices: memory 112, one or more processors 114, one or more presentation components 116, input/output (I/O) ports 118, I/O components 120, a power supply 122, and a network component 124. The computing device 100 should not be interpreted as having any dependency or requirement related to any single component or combination of components illustrated therein. While the computing device 100 is depicted as a single device, multiple computing devices 100 can work together and share the depicted device resources. For instance, the memory 112 can be distributed across multiple devices, the processor(s) 114 can be housed on different devices, and so on.

The bus 110 represents a system bus that can be any of several types of bus structures, including a memory bus or memory controller, a peripheral bus, and a local bus using any of a variety of bus architectures.

Although the various blocks of FIG. 1 are shown with lines for the sake of clarity, delineating various components is more accurately grey and fuzzy. For example, one can consider a presentation component such as a display device to be an I/O component. Also, processors have memory. Such is the nature of the art, and the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and the references herein to a "computing device."

The memory 112 can be used to store and access instructions configured to carry out the various operations disclosed herein. In some examples, the memory 112 includes computer-readable media in the form of volatile and/or nonvolatile memory, removable or non-removable memory, data disks in virtual environments, or a combination thereof.

The memory area stores, among other data, one or more applications. The applications, when executed by the processor, operate to perform functionality on the computing device. The memory area further stores one or more computer-executable components. Exemplary components can include a user interface component.

By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer. Computer storage media does not, however, include propagated signals. Rather, computer storage media excludes propagated signals. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory includes computer storage media in the form of volatile and/or nonvolatile memory such as read only memory (ROM) and random-access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by a processing unit or processor.

The computer can also include other removable/non-removable, volatile/nonvolatile computer storage media, such as, for example only, a hard disk drive that reads from or writes to non-removable, nonvolatile magnetic media, a universal serial bus (USB) port that provides for reads from or writes to a removable, nonvolatile memory, and an optical disk drive that reads from or writes to a removable, non-volatile optical disk such as a CD ROM or other optical media. Other removable/non-removable, volatile/nonvolatile computer storage media that can be used in an exemplary operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface, and a USB port and optical disk drive are typically connected to the system bus by a removable memory interface.

The processor(s) 114 can include any quantity of processing units that read data from various entities, such as the memory 112 or the I/O components 120. Specifically, the processor(s) 114 are programmed to execute computer-executable instructions for implementing aspects of the disclosure, such as to perform anomaly detection as described herein. The instructions can be performed by the processor, by multiple processors within the computing device 100, or by a processor external to the computing device 100. In some examples, the processor(s) 114 are programmed to execute instructions such as those illustrated in the flowcharts discussed below and depicted in the accompanying drawings. Moreover, in some examples, the processor(s) 114 represent an implementation of analog techniques to perform the operations described herein. For example, the operations can be performed by an analog client computing device and/or a digital client computing device.

The presentation component(s) 116 present data indications to a user or other device. Exemplary presentation components include a display device, speaker, printing component, vibrating component, etc. One skilled in the art will understand and appreciate that computer data can be presented in a number of ways, such as visually in a graphical user interface (GUI), audibly through speakers, wirelessly between computing devices 100, across a wired connection, or in other ways.

The ports 118 allow the computing device 100 to be logically coupled to other devices including the I/O components 120, some of which can be built in. Examples of the I/O components 120 include, for example but without limitation, a microphone, keyboard, mouse, joystick, game pad, satellite dish, scanner, printer, wireless device, etc.

In some examples, the network component 124 includes a network interface card and/or computer-executable instructions (e.g., a driver) for operating the network interface card. Communication between the computing device 100 and other devices can occur using any protocol or mechanism over any wired or wireless connection. In some examples, the network component 124 is operable to communicate data over public, private, or hybrid (public and private) networks using a transfer protocol, between devices wirelessly using short range communication technologies (e.g., near-field communication (NFC), BLUETOOTH® branded communications, or the like), or a combination thereof.

A computer, or computing device, as used herein, represents any device executing instructions (e.g., as application programs, operating system functionality, or both) to implement the operations and functionality as described herein. The computing device can include a mobile computing device or any other portable device. In some examples, the mobile computing device includes a mobile telephone, laptop, tablet, computing pad, netbook, gaming device, wearable device and/or portable media player. The computing device can also include less portable devices such as desktop personal computers, kiosks, tabletop devices, industrial control devices, wireless charging stations, and electric automobile charging stations. Additionally, the computing device can represent a group of processing units or other computing devices.

Figure 2:
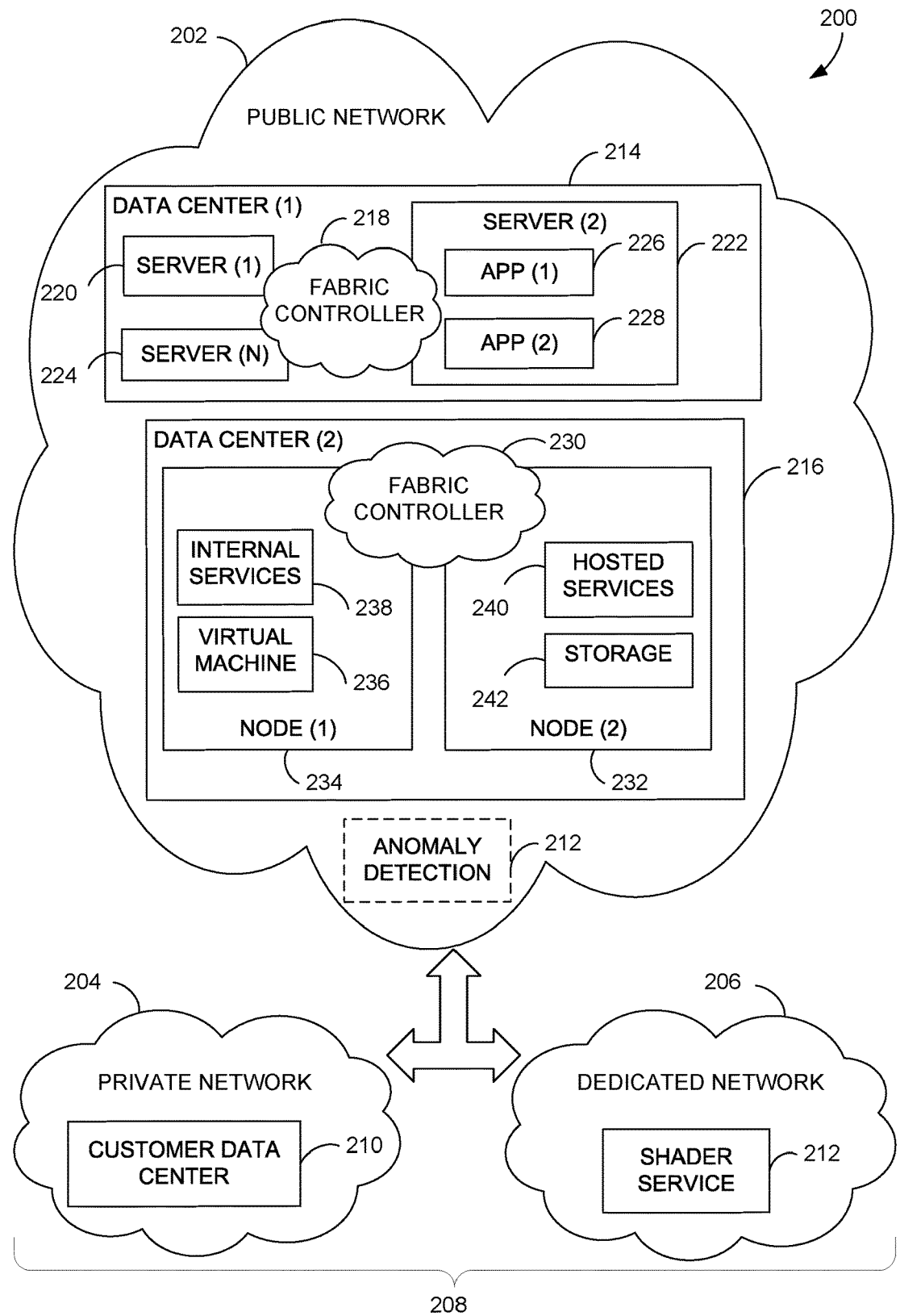
FIG. 2 is a block diagram of an example cloud-computing infrastructure suitable for an anomaly detection module implementing various examples disclosed herein.

Turning now to FIG. 2, an exemplary block diagram illustrates a cloud-computing environment for anomaly detection. The architecture 200 illustrates an exemplary cloud-computing infrastructure, suitable for use in implementing aspects of this disclosure. The architecture 200 should not be interpreted as having any dependency or requirement related to any single component or combination of components illustrated therein. In addition, any number of nodes, virtual machines, data centers, role instances, or combinations thereof can be employed to achieve the desired functionality within the scope of embodiments of the present disclosure.

The distributed computing environment of FIG. 2 includes a public network 202, a private network 204, and a dedicated network 206. The public network 202 can be a public cloud-based network of computing resources, for example. The private network 204 can be a private enterprise network or private cloud-based network of computing resources. And the dedicated network 206 can be a third-party network or dedicated cloud-based network of computing resources. In some examples, the private network 204 can host a customer data center 210, and the dedicated network 206 can host cloud anomaly detection services 212, which are discussed in more detail below relative to FIG. 4.

The hybrid cloud 208 can include any combination of the public network 202, the private network 204, and the dedicated network 206. For example, the dedicated network 206 can be optional, with the hybrid cloud 208 comprised of the public network 202 and the private network 204. Along these lines, some customers can opt to only host a portion of the customer data center 210 in the public network 202 and/or the dedicated network 206, retaining some of the customers' data or hosting of customer services in the private network 204. For example, a customer that manages data or customer accounts can elect or be required to maintain various controls over the dissemination account data stored in its data center or the applications processing such data (e.g., software for payments, online storefront operations, etc.). Myriad other scenarios exist whereby customers desire or need to keep certain portions of data centers under the customers' own management. Thus, in some examples, customer data centers can use the hybrid cloud 208 in which some data storage and processing is performed in the public network 202 while other data storage and processing is performed in the dedicated network 206.

The public network 202 can include data centers configured to host and support operations, including tasks of a distributed application, according to a fabric controller 218. It will be understood and appreciated that the data center 214 and the data center 216 shown in FIG. 2 are merely examples of suitable implementations for accommodating one or more distributed applications and are not intended to suggest any limitation as to the scope of use or functionality of examples disclosed herein. Neither should the data center 214 and the data center 216 be interpreted as having any dependency or requirement related to any single resource, combination of resources, combination of servers (e.g., servers 220 and 224), combination of nodes (e.g., nodes 232 and 234), or a set of application programming interfaces (APIs) to access the resources, servers, and/or nodes.

The data center 214 illustrates a data center comprising a plurality of servers, such as the servers 220 and 224. The fabric controller 218 is responsible for automatically managing the servers 220 and 224 and distributing tasks and other resources within the data center 214. By way of example, the fabric controller 218 relies on a service model (e.g., designed by a customer that owns the distributed application) to provide guidance on how, where, and when to configure the server 222 and how, where, and when to place the application 226 and the application 228 thereon in some examples. One or more role instances of a distributed application can be placed on one or more of the servers 220 and 224 of the data center 214, where the one or more role instances can represent the portions of software, component programs, or instances of roles that participate in the distributed application. In other examples, one or more of the role instances can represent stored data that are accessible to the distributed application.

The data center 216 illustrates a data center comprising a plurality of nodes, such as the node 232 and the node 234. One or more virtual machines can run on nodes of the data center 216, such as a virtual machine 236 of the node 234 for example. Although FIG. 2 depicts a single virtual node on a single node of the data center 216, any number of virtual nodes can be implemented on any number of nodes of the data center 216 in accordance with illustrative embodiments of the disclosure. Generally, the virtual machine 236 is allocated to role instances of a distributed application, or service application, based on demands (e.g., amount of processing load) placed on the distributed application. As used herein, the phrase "virtual machine" is not meant to be limiting, and can refer to any software, application, operating system, or program that is executed by a processing unit to underlie the functionality of the role instances allocated thereto. Further, the virtual machine(s) 236 can include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of the data center 216 and for placing the role instances and other resources (e.g., software components) within the data center 216. By way of example, the fabric controller 230 relies on a service model (e.g., designed by a customer that owns the service application) to provide guidance on how, where, and when to configure the virtual machines, such as the virtual machine 236, and how, where, and when to place the role instances thereon in some examples.

As discussed above, the virtual machines can be dynamically established and configured within one or more nodes of a data center. As illustrated herein, the node 232 and the node 234 can be any form of computing devices, such as, for example, a personal computer, a desktop computer, a laptop computer, a mobile device, a consumer electronic device, a server, the computing device 100 of FIG. 1, and the like. In one instance, the nodes 232 and 234 host and support the operations of the virtual machine(s) 236, while simultaneously hosting other virtual machines carved out for supporting other tenants of the data center 216, such as internal services 238 and hosted services 240. Often, the role instances can include endpoints of distinct service applications owned by different customers.

Typically, each of the nodes 232 and 234 include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit can encompass a processor (not shown) coupled to the computer-readable medium (e.g., computer storage media and communication media) accommodated by each of the nodes.

The role of instances that reside on the nodes can be to support operation of service applications, and thus they can be interconnected via APIs. In one instance, one or more of these interconnections can be established via a network cloud, such as the public network 202. The network cloud serves to interconnect resources, such as the role instances, which can be distributed across various physical hosts, such as the nodes 232 and 234. In addition, the network cloud facilitates communication over channels connecting the role instances of the service applications running in the data center 216. By way of example, the network cloud can include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Figure 3:
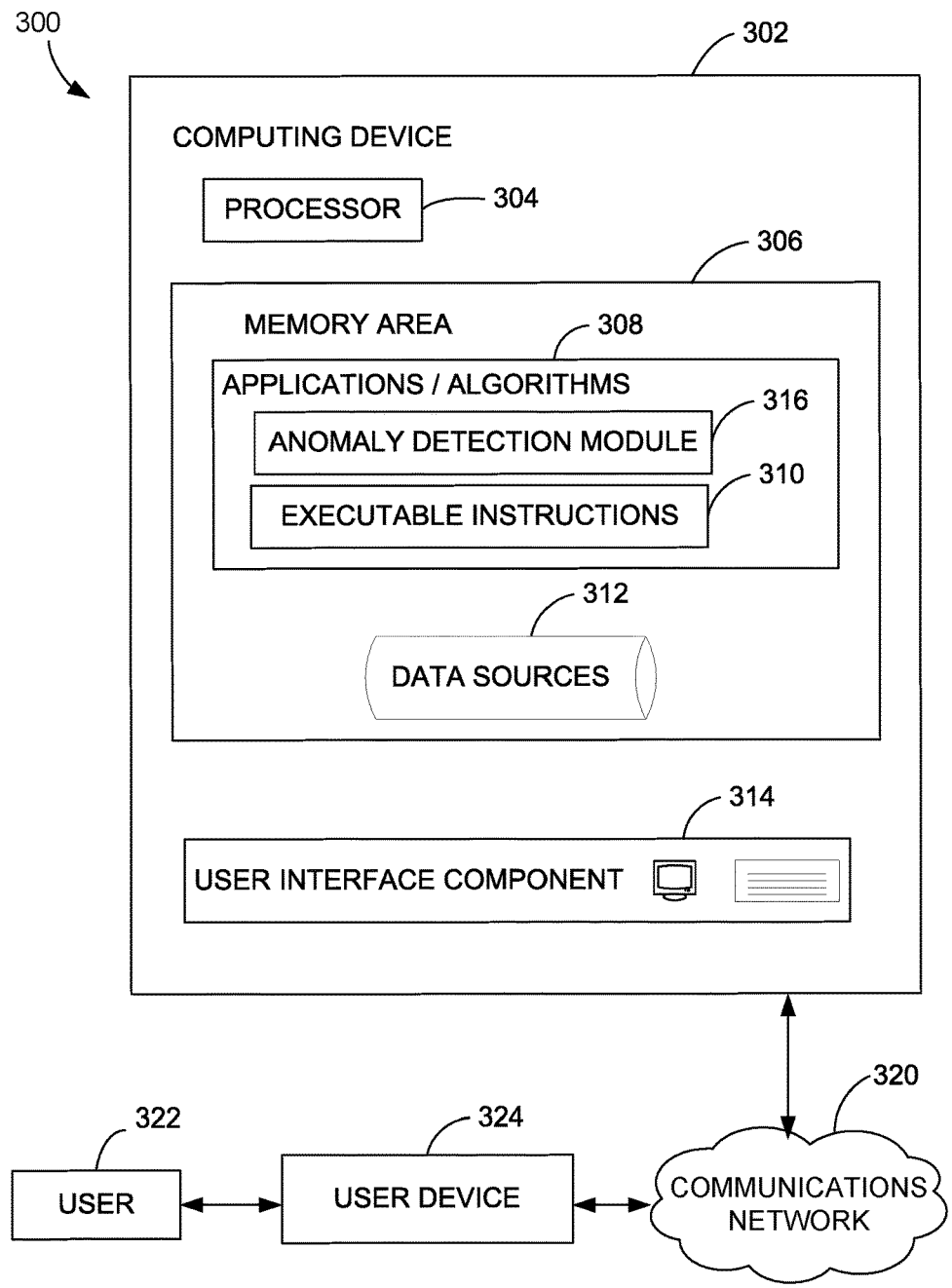
FIG. 3 is a block diagram of an example computing environment that can be implemented as a device using various examples disclosed herein.

FIG. 3 is a block diagram of an example computing environment 300 that can be implemented as a physical device or virtual device using some of the various examples disclosed herein. The computing device 302 represents any device executing instructions (e.g., as application programs, operating system functionality, or both) to implement operations and functionality as described herein, such as anomaly detection. The computing device 302 can include a mobile computing device or any other portable device. In some examples, a mobile computing device includes a mobile telephone, laptop, tablet, computing pad, netbook, gaming device, wearable device, head mounted display (HMD) and/or portable media player. The computing device 302 can also represent less portable devices such as desktop personal computers, kiosks, tabletop devices, industrial control devices, wireless charging stations, electric automobile charging stations, and other physical objects embedded with computing resources and/or network connectivity capabilities. Additionally, the computing device 302 can represent a group of processing units or other computing devices.

In some examples, the computing device 302 has at least one processor 304, a memory area 306, and at least one user interface. These can be the same or similar to the processor(s) 114 and memory 112 of FIG. 1, respectively. The processor 304 includes any quantity of processing units and is programmed to execute computer-executable instructions for implementing aspects of the disclosure. The instructions can be performed by the processor or by multiple processors within the computing device, or performed by a processor external to the computing device. In some examples, the processor 304 is programmed to execute instructions such as those that are illustrated in the other figures.

The computing device 302 further has one or more computer readable media such as the memory area 306. The memory area 306 includes any quantity of media associated with or accessible by the computing device. The memory area 306 can be internal to the computing device 302 (as shown in FIG. 3), external to the computing device (not shown), or both (not shown). In some examples, the memory area 306 includes read-only memory and/or memory wired into an analog computing device.

The memory area 306 stores, among other data, one or more applications or algorithms 308 that include data and executable instructions 310. The applications, when executed by the processor, operate to perform functionality on the computing device. Exemplary applications include anomaly detection applications, tools, and/or components, such as an anomaly detection module 316, for example. The applications can communicate with counterpart applications or services such as web services accessible via a network, including a communications network 320. For example, the applications can represent downloaded client-side applications that correspond to server-side services executing in a cloud. In some examples, applications generated can be configured to communicate with data sources and other computing resources in a cloud during runtime, or can share and/or aggregate data between client-side services and cloud services. The memory area 306 can store data sources 312, which represent data stored locally at the memory area 306, data access points stored locally at the memory area 306 and associated with data stored remote from the computing device 302, or any combination of local and remote data in various examples.

The user interface component 314 can include instructions executed by the processor 304 of the computing device 302, and cause the processor 304 to perform operations, including to receive user input, provide output to a user and/or user device, and interpret user interactions with a computing device to provide anomaly detection as described herein. Portions of the user interface component 314 can thus reside within the memory area 306. In some examples, the user interface component 314 includes a graphics card for displaying data to a user 322 and receiving data from the user 322. The user interface component 314 can also include computer-executable instructions (e.g., a driver) for operating the graphics card. Further, the user interface component 314 can include a display (e.g., a touch screen display or natural user interface) and/or computer-executable instructions (e.g., a driver) for operating the display. In some examples, the display can be a 3D display, such as can be found in an HMD. The user interface component 314 can also include one or more of the following to provide data to the user or receive data from the user: a keyboard (physical or touchscreen display), speakers, a sound card, a camera, a microphone, a vibration motor, one or more accelerometers, a BLUETOOTH® brand communication module, global positioning system (GPS) hardware, and a photoreceptive light sensor. For example, the user can input commands or manipulate data by moving the computing device in a particular way. In another example, the user can input commands or manipulate data by providing a gesture detectable by the user interface component, such as a touch or tap of a touch screen display or natural user interface. In still other examples, a user, such as the user 322, can interact with a separate user device 324, which can control or be controlled by the computing device 302 over the communications network 320, a wireless connection, or a wired connection.

Figure 4:
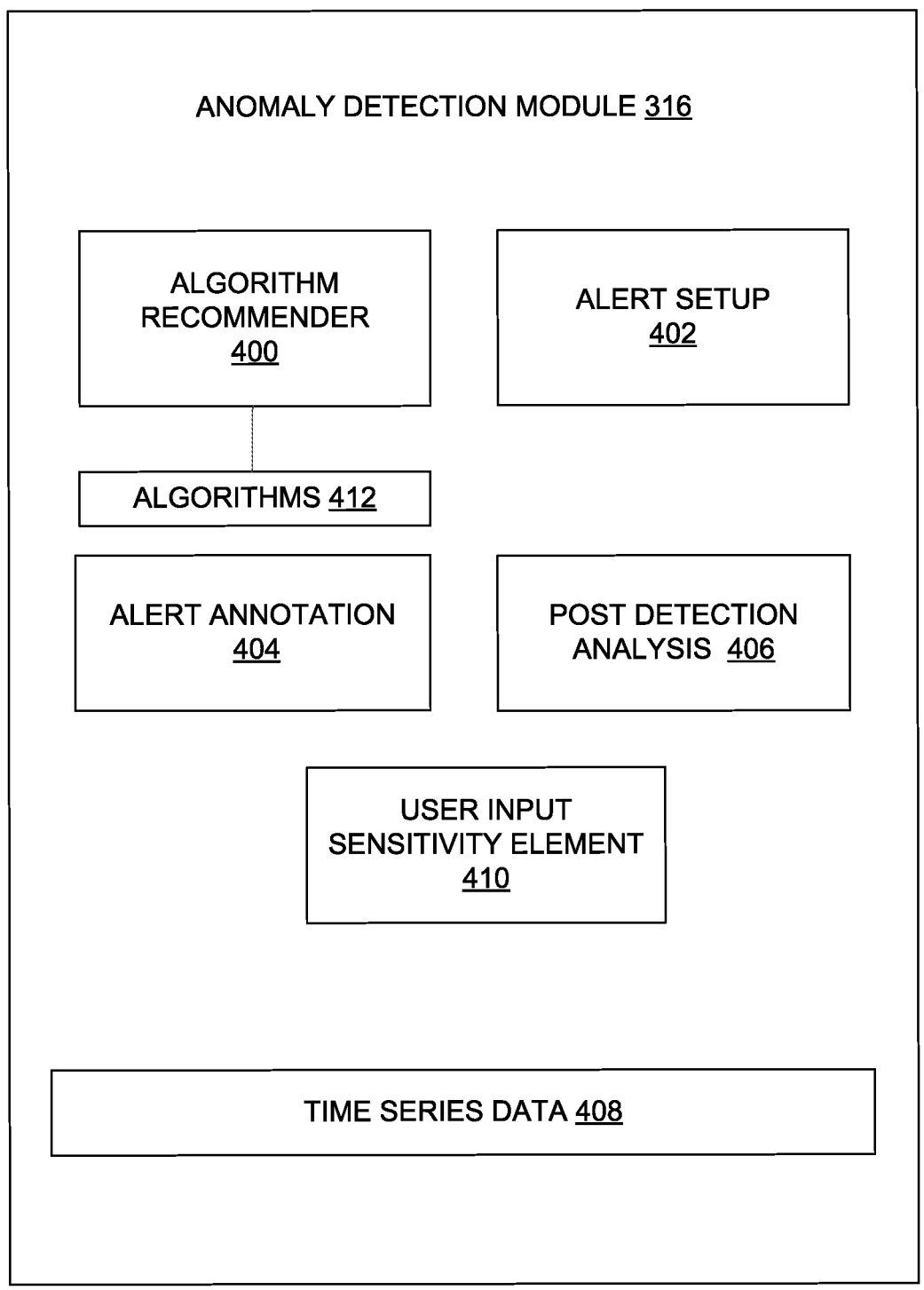
FIG. 4 is a block diagram of an anomaly detection module suitable for implementing various examples disclosed herein.

FIG. 4 is a block diagram of the anomaly detection module 316 that is suitable for implementing some of the various examples disclosed herein. The anomaly detection module 316 can be implemented as a cloud service, in part or in whole, and can further be implemented on one or more computer storage devices having computer-executable instructions stored thereon for data anomaly detection. That is, the anomaly detection module 316 can leverage computing environments described in relation to other figures described herein. It should be understood that functionality can be allocated among the different portions in some embodiments differently than is described in this exemplary embodiment.

The anomaly detection module 316 is some examples includes an algorithm recommender component 400, an alert setup component 402, an alert annotation component 404, and a post-detection analysis component 406. The anomaly detection module 316 is configured to perform anomaly detection on time series data 408 as described. In one example, one or more anomaly alerts are defined as determined by the alert setup component 402 and tuned based on a user input received at a user input sensitivity element 410 (e.g., a virtual slider element). The user input sensitivity element 410 is adjustable to define a sensitivity for one or more algorithms of a plurality of anomaly detection algorithms 412 to change a corresponding sensitivity mapping by automatically changing one or more parameters for the one or more algorithms 412. Anomaly detection results of a change to the user input sensitivity element are then displayed in some examples (e.g., simulation results).

In some examples, the plurality of anomaly detection algorithms 412 are trained by the algorithm recommender component 400 to recommend one or more algorithms of the plurality of anomaly detection algorithms 412 to process the time series data 408 to detect one or more anomalies. The training in some examples is based in part on iterative learning using feedback including data relating to user input of previous selections of one or more algorithms of the plurality of anomaly detection algorithms 412. Additionally, in some examples, user feedback is received at the post-detection analysis component 406 and calibration of the one or more algorithms of the plurality of anomaly detection algorithms 412 is performed based at least in part on the received user feedback. For example, the received user feedback includes labeled data received by the alert annotation component 404 and used to train the one or more algorithms 412 using machine learning. It should be noted that the time series data 408 can be any type of data and correspond to any time period(s).

Thus, the anomaly detection module 316 allows for adjustable sensitivity anomaly detection using one or more automatically recommended anomaly detection algorithms 412. The anomaly detection module 316 in some examples can perform anomaly detection in real-time in online operations or offline operations.

In various examples, the anomaly detection module 316 is configured to provide one or more of the following:

1. Improvement to Holt-Winters Seasonal Forecasting that is not based solely on predicting a range of monitored data based on historical distribution, such that when observed values exceed upper or lower bounds, an alert is generated. The present disclosure provides improvements in the areas of (A) band attenuation, (B) seasonal bands, and (C) the method of initialization as described herein.

2. 'Adaptive' Streaming Least Square (SLS)—a modified SLS is provided that adds an adaptive heuristic to handle large volume and sparse data. The adaptive SLS learns thresholds by looking at historical data.

3. The anomaly detection algorithm recommender 400, which in various examples, does not rely on expert knowledge (e.g., humans) to select the best algorithm for anomaly detection based on the different types of workloads. The present disclosure leverages a collection of anomaly detection algorithms 412 to provide a recommendation based on statistical analysis of the targeting workload to select the algorithm that suits the workload. In one example, reliability, latency, and request rate are factors. The statistical analysis includes collecting data relating to user behavior (which algorithms are chosen), and then using that collected data to recommend algorithms in the future.

4. A sensitivity sliding bar as the user input sensitivity element 410 and mapping, wherein each anomaly detection algorithm has multiple parameters, is also used in various examples. Algorithm tuning involves an understanding of the algorithm and the parameters. The preset disclosure provides a sensitivity bar on a user interface to simplify the alert calibration/parameter tuning experience. Sensitivity mapping is performed to map anomaly degree with corresponding parameter settings to a sensitivity score based on statistical analysis of data distribution of counters to normalize the sensitivity range for different counters using the same algorithm. This provides the ability to auto-calibrate anomaly detection for multiple pivots using a single slider as a proxy for sensitivity. In some examples, statistical analysis results are mapped to a bar chart.

More particularly, some examples of anomaly detection and diagnosis of the present disclosure are implemented as follows:

Approach:
Machine Intelligence+Human Wisdom:
Continuous improvement through iterative learning from implicit & explicit expert feedback.
Collection of anomaly detection algorithms:
Streaming Least Squares (e.g., MSR);
Holt-Winters;
Percentage change; and
Other algorithms or combinations thereof.
Automatic algorithm recommendation and assisted parameter tuning:
Unsupervised approach to initial algorithm selection and parameter tuning.
Feedback to algorithm, sparse and dynamic labeling.
Crowdsourcing algorithm recommendation overtime using existing\successful setups.
Anomaly detection as building block to understand system:
Useful "causality" as temporal correlation of anomalies.

Figure 5:
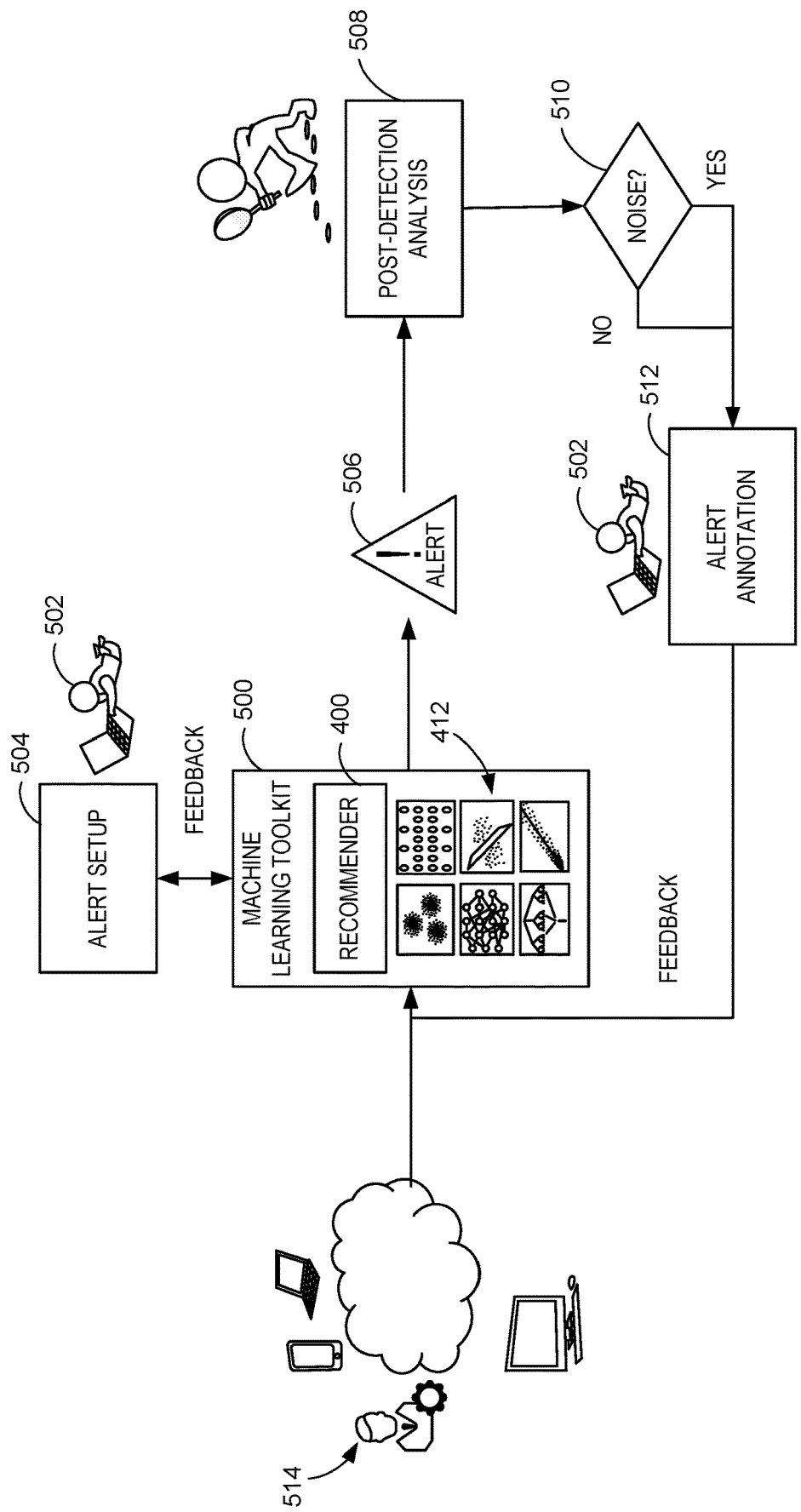
FIG. 5 is a flow diagram of an anomaly detection process for implementing various examples disclosed herein.

One example of anomaly detection is illustrated FIG. 5. The anomaly detection uses the algorithm recommender component 400 as part of a machine learning toolkit 500 to recommend and/or select one or more of the algorithms 412. Examples of anomaly detection algorithms (e.g., machine learning algorithms) include, but are not limited to 1. modified Holt-Winters, 2. adaptive SLS and 3. percentage change as described below. As described herein, a user 502 can tune anomaly alerts 506 using an alert setup 504, which in some examples includes feedback from the machine learning toolkit 500. Further tuning can be performed using a post-detection analysis function 508, which includes a determination 510 of an amount of noise in the data and an alert annotation 512 (e.g., sparse or dynamic labeling) by the user 502 (that also provides feedback to the machine learning toolkit 500). Thus, the machine learning toolkit 500 is configured for iterative learning from implicit and explicit feedback and allows for a more efficient and user friendly interface to an end user 514.

The various examples implement one or more of the algorithms, alone or in combination with each other, as described below.

1. Holt-Winters
Example Target Scenario:
Detects extra elevation or degradation on top of seasonal patterns.
Example Technique:
Exponential smoothing.

An example implementation using a Holt-Winters anomaly detection algorithm is described below. The present disclosure provides modifications and/or enhancements to a Holt-Winters attribute. In various examples, these modifications and/or enhancements are effective in tracking anomalies in periodic time series found in various systems. Periodicity in such systems is usually affected by human users with strong daily and weekly cycles.

Emphasize History Tracking Over Fit with Low Alpha/Gamma

Exponential smoothing results in a moving average where previous timeslots are taken in exponentially decreasing proportions, the more the timeslots are in the past. The smoothing factor (usually referred to as alpha, in simple single smoothing) determines how much to weigh recent observations versus more distant history (in time). The higher the alpha, the more weight is given to the recent observations.

An example exponential smoothing formula is recursive as follows:

$$L[t] = \text{alpha} * y[t] + (1 - \text{alpha}) * L[t-1],$$

where y[t] is the most recent observation at time "t", while L[t−1] is the smoothing result from previous "t−1" timeslot. With a simple recursive substitution for L[t−1] the formula evaluates to the form that shows the exponential reduction of (1-alpha) for earlier datapoints:

$$L[t] = \text{alpha}(1-\text{alpha})^\wedge 0 * y[t] + \\ \text{alpha}(1-\text{alpha})^\wedge 1 * y[t-1] + \text{alpha}(1-\text{alpha})^\wedge 2 * y[t-2] + \\ \text{alpha}(1-\text{alpha})^\wedge 3 * y[t-3] + \text{alpha}(1-\text{alpha})^\wedge 4 * y[t-4] + \ldots$$

In developing the model, and attempting to estimate the parameters alpha/beta/gamma using a method of minimizing least squares in R, it was determined that fitting the model to highest accuracy and building the model for anomaly detection are two different processes. When a series is perfectly regular with the same pattern repeating perfectly over and over (e.g., classic sine wave) then the selection of smoothing parameters does not matter. Regardless how much recency versus history is weighted, the results are the same. But, when the series starts to change, fitting the model will almost always result in very high values for alpha/ gamma. In one example, an alpha of 0.85 and gamma of 1 were obtained. These high values result in a good fit, because the recent values are more emphasized (e.g., if there is gamma of 1, no further analysis before the last period is performed). With a series that starts to change, the best fit is the most recent period, which is relied upon (used).

Looking at practical anomaly prediction to achieve a lower alpha/gamma, reliance is more on the past and less on the last period. A desired prediction curve shows a measured amount of resistance to change, i.e. weigh the history a bit more than immediate recency. From experiments, alpha=0.1 and gamma=0.2 is selected as defaults to fit most common series shapes. In some example, these values do not exceed 0.3, and may be reduced to 0.05. However, other values are contemplated and can be used as the default values.

With respect to beta (the trend smoothing parameter), the beta is set to 0 by default in some examples. For example, this value is implemented because real time series in business and technology change trends very frequently. Changing trends are particularly pronounced when new time series are starting up or terminating due to the introduction or termination of products, technologies, etc. It was found that even with zero beta, the lack of trend component was compensated by the changes in Lt (overall level).

Figure 6:
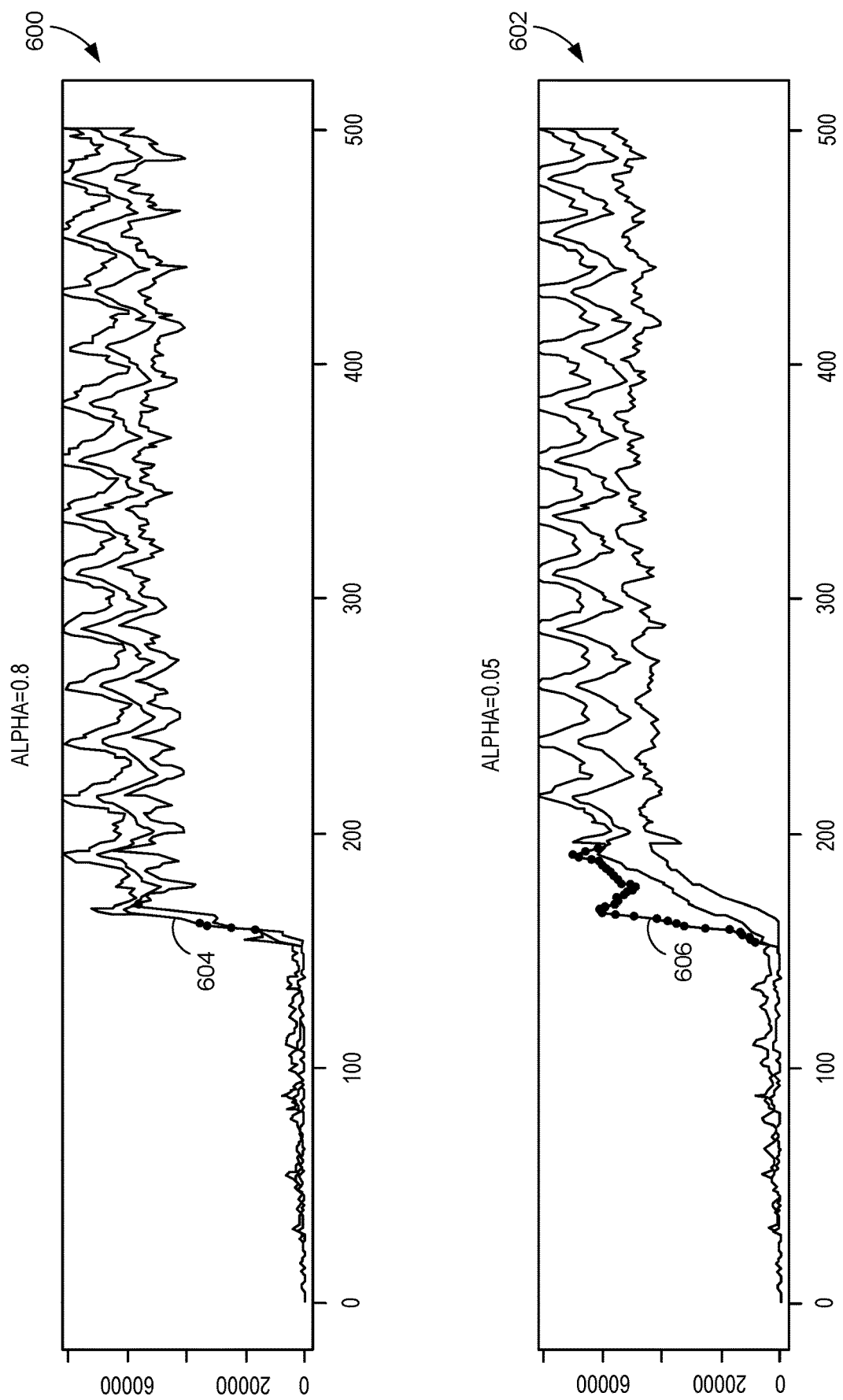
FIG. 6 are graphs illustrating different smoothing factors in accordance with various examples disclosed herein.

The charts 600 and 602 shown in FIG. 6 illustrate the impact of alpha (level smoothing factor). As can be seen by the graph line 604, a high alpha of, for example, 0.8 makes the expected bands very responsive to changes (0.8 of the prediction is taken from the last data point). As can be seen by the graph line 606, a low alpha of, for example, 0.05 makes the prediction rely more on the past and adjust to the series movements much more slowly. Thus, various examples adjust the alpha accordingly.

Seasonal Error Tracking with Exponential Smoothing

In various examples, errors from predictions are the base for the bands that are used to declare anomalies (e.g., generate alerts) when the series datapoint falls out of bands.

Figure 7:
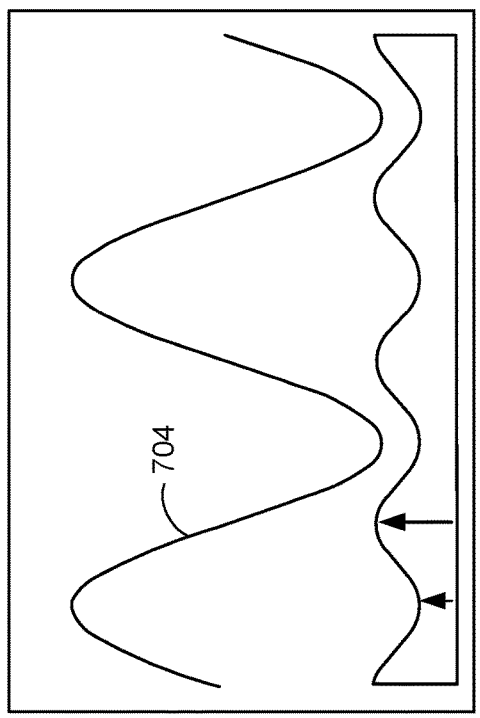
FIG. 7 are graphs illustrating error tracking in accordance with various examples disclosed herein.
Figure 7:
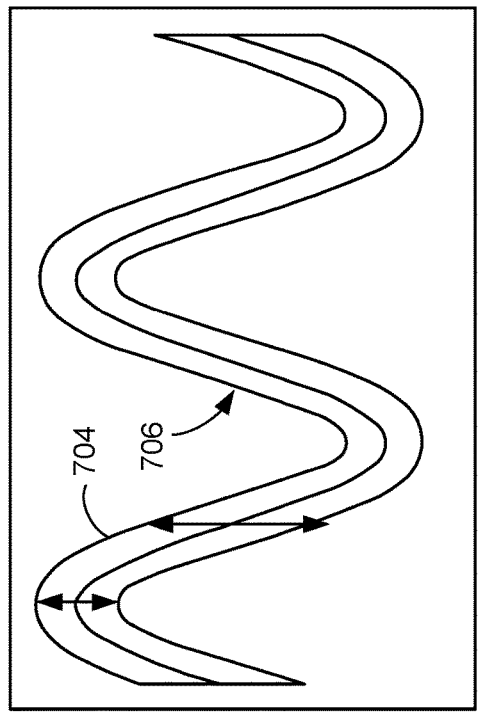
Figure 7:
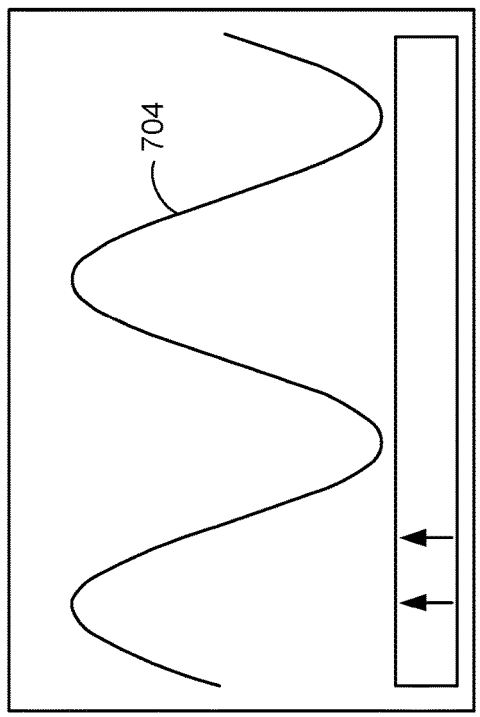
Figure 7:
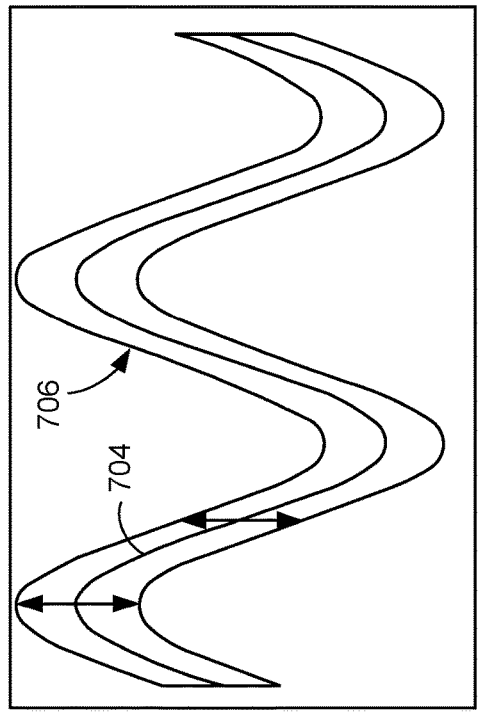

In one example, a single average of past errors is used. The effect of using this single average is illustrated in the graphs 700A, 700B and shown in FIG. 7. As can be seen, when such simple average is applied to a cyclical curve 704, it was found that the bands 706 appear thin when the curve 704 is steeper (more vertical). Conversely the bands 706 are thickest when the curve is flatter (more horizontal). The change in thickness is illustrated by the change in the length of the arrows.

Because of this band thinning effect, in one example, the algorithm can show more false positives around steep sections, such that a small movement of the curve sideways would likely push out of bands.

In some examples, the errors per point in cycle (each error is an average of the errors that happened 1,2,3, . . . periods ago) are averaged, which results in thickening of the bands 706 around steeper points of the cycle of the curve 704. This effect is illustrated in the graphs 702A, 702B. The errors in systems showing periodicity above were confirmed empirically.

In one example, to compute average errors at each point in a cycle, an exponential smoothing is applied to an array of errors that is indexed the same way as the seasons table in Holt-Winters base algorithm. In some examples, different alpha coefficients are utilized when the new error is above a past smoothed average and when the new error is below that average. This allows for the control of the speed of growth and reduction of the bands 706 independently. For example, when "alpha above" is higher than "alpha below", the bands 706 are grown quicker than reducing the bands.

As should be appreciated, when tracking errors by seasons, periodic spikes have a variance higher than the flatter sections of the time series.

Single Period Season Initialization

Traditional Holt-Winters initialization rely on computing an average value of a seasonal component from multiple (usually more than 3) seasons. This can become computationally more "expensive" in a typical software system as the process requires tracking or retrieval of multiple seasons.

Various examples minimize the amount of data storage to a single season, since one season tracking is a minimum requirement for proper functioning of Holt-Winters algorithm. Two techniques to simulate traditional approaches with single season storage can be used: 1. adjusted weights when accumulating seasons in the initialization seasons and 2. detrending the first season with polynomial curve fitted trend during startup as described below.

Using Adjusted Weights in Initialization Seasons

In one example, when starting the processing of a new series, the seasons are initialized as an approximately equal average of all initial seasons. This process in various examples includes:
1. When processing the $1^{st}$ season, take $\frac{1}{1}$ of the seasonal values and store.
2. When processing the second season, take ½ of the first stored season and ½ of the second.
3. When processing the 3rd season take ⅔ of the accumulated first two seasons and ⅓ of the 3rd. This results taking ⅓ of each season.
4. When processing the 4th season take ¾ of the accumulated first two seasons and ¼ of the 4th. This results in taking ¼ of each season.
5. The process is continued until all initial seasons are processed. As a result, all initial seasons are equally weighed.

It should be appreciated that as used herein, seasons refers to any defined time period, such as based on the particular implementations, application, industry, etc. For example, seasonal data can be data divided into "seasons", which can be defined by days, weeks, months, and years, among other time periods.

Detrending the First Season with Polynomial Curve Fitted Trend

In some examples, when a new time series is created (e.g. due to a product launch), the series tends to rise in a manner that is different from later behavior (e.g., speeds up initially and then starts slowing down). These changes in growth can affect (e.g., be memorized in) the seasonal component and distort the future estimates. These problems are particularly acute in multi cycle seasons, such as in a weekly season with daily variations tracked at an hourly or lower granularity.

In one example, an algorithm uses polynomial curve fitting to eliminate the fluctuations in the speed of growth. A polynomial of order 1 is a linear estimate. That linear estimate results in a season that memorized a strong initial growth in the first two days, which is unlikely to fit the series after the series stabilizes. As the order of polynomial increases, the initial growth curve is extrapolated better and removed from the extracted season. At the order of 4, even the middle drop that corresponded to a weekend is removed, which is technically not desirable, but empirical results show that there are overall gains in accuracy of the extracted season. For example, the distortion causes a series of false positives with polynomial order of 1, which disappears with the order of 4.

For weekly seasonality at an hourly granularity, a polynomial order of 4 is useful since the trend fluctuates significantly within the first week. However, with a weekly season with coarser daily granularity, the season has only one cycle in most cases (rather than 7) and doing a simple linear detrending works better.

In some examples, the Holt-Winters algorithm is used and based on exponential smoothing and predicts values in a time series with seasonal components. The Holt-Winters algorithm used in various examples, thus, supports adaptivity by weighing recent history more heavily than the distant past (farther back in time) in both the prediction and estimation of error. The results for the algorithm is visualized as the time series pictured in the context of the tolerance bands. If the series crosses the bands, an anomaly is declared (e.g., alert generated) in various examples.

Thus, the Holt-Winters algorithm is used in various examples to predict values in a time series with seasonal components. This algorithm is useful, for example, with a large amount of time series data, such as data that fluctuates with daily and weekly patterns of customer usage. This algorithm is based on exponential smoothing that averages the recent value of the metric across the basic components of overall level, trend and season. The new values are calculated from the previous values and the next data point, which makes the algorithm particularly suited for online streaming applications in some examples. In addition to application of the basic Holt-Winters prediction model, the present disclosure tracks the historical deviations from the predictions, which allows determining if the newly arriving data point deviates within past norms. The deviations are averaged using exponential smoothing, similar to the baseline Holt-Winters algorithm. Since both the prediction and estimation of error weigh recent history more heavily than the distant past, the anomaly detection or various examples is adaptive. When the changes in the time series become more erratic, the expected deviations grow, which reduces false positives. Conversely, when the metric stabilizes into a more regular pattern, the expected deviations decrease resulting in increased sensitivity. The results for the algorithm can be visualized as the time series pictured in the context of the tolerance bands. If the series crosses the bands, an anomaly is declared as described herein.

In some examples, the Holt Winters algorithm is used with metrics that exhibit regular daily pattern. The effectiveness reduces with the introduction of irregularity. It should not be noted that in various examples, the Holt Winters algorithm is not used to track reliability normalized to 100%, because the algorithm would likely memorize any drops and treat the drops as recurrent elements. In this case, a fixed threshold is used in various examples.

One or more parameters are adjustable in various examples, such as the band that indicates if the anomaly should be declared when the series crosses the upper band, lower band or any of the bands (both bands) and tolerance, which is the multiplier that is applied to the smoothed historical deviations to arrive at the bands. The higher the tolerance, the wider the bands.

2. Streaming Least Squares
Example Target Scenario:
Detects unusually high change velocity within sliding window.
Example Technique:
Linear regression.

Figure 8:
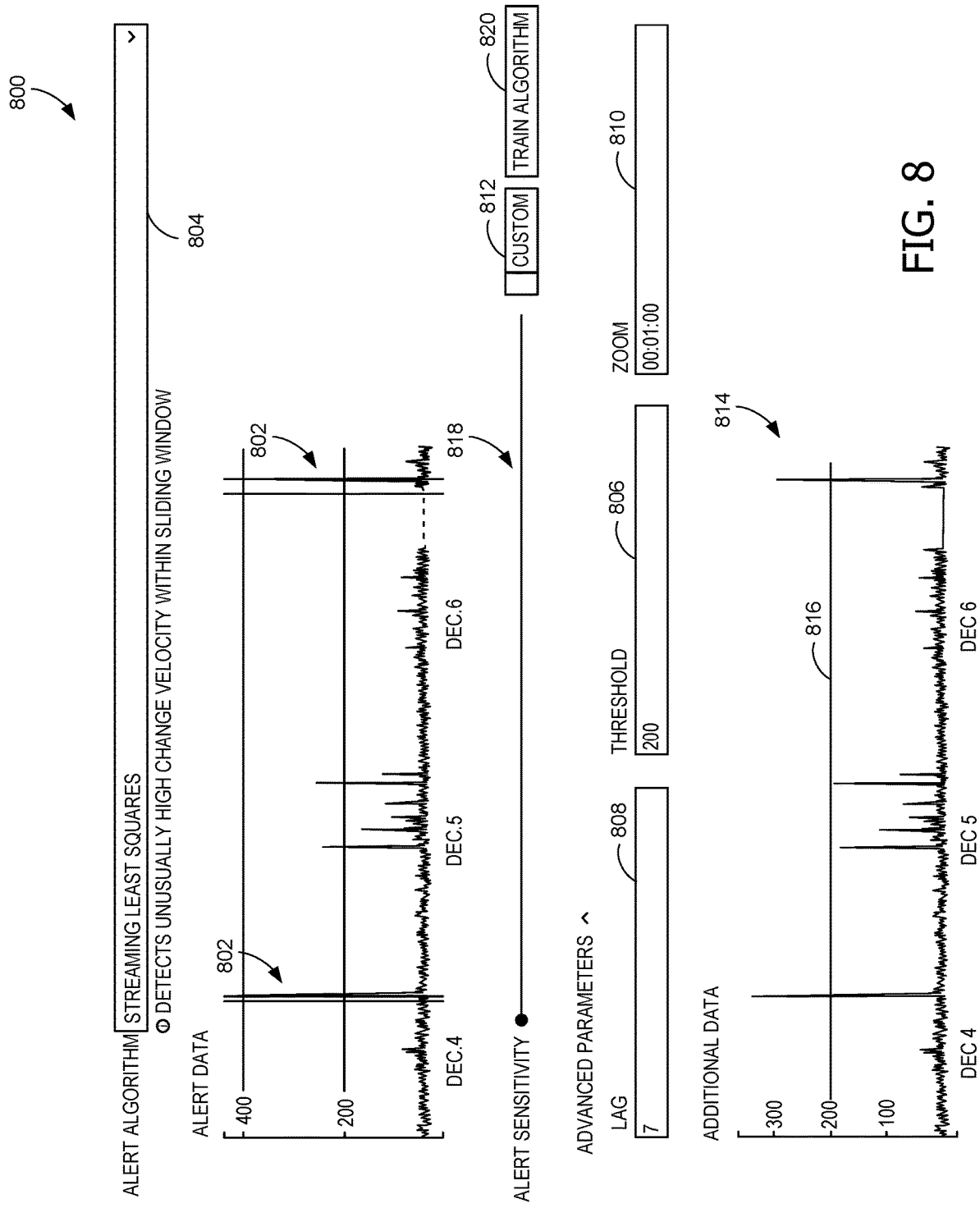
FIG. 8 illustrates a user interface in accordance with various examples disclosed herein.

In one example, as illustrated by the user interface 800 shown in FIG. 8, the SLS is selected at the input 804 and transformed from Ordinary Least Squares (OLS) with improved efficiency. As should be appreciated, the input 804 allows the user to select from a plurality of algorithms, such as the algorithms 412 (shown in FIG. 4). The input 804 is illustrated as a selectable element that provides a drop-down menu of the available algorithms, which in some examples, include all available algorithms. In other examples, only recommended algorithms can be selected. That is, the algorithm recommender 400 (shown in FIG. 4) recommends algorithms to the user that can be tuned as described herein. Thus, while the present example illustrates an SLS algorithm, the user interface 800 is configured to allow selection of different algorithms as described herein.

In operation, for each sliding window 802 (which can be user defined or automatically defined), the SLS runs OLS and computes a regression residual. The regression residual is reported as an SLS score, which is the anomaly of that window 802. The results are sorted by SLS score and classified into levels, which are formed on the basis that anomalies in the same level have similar scores, in similar fashion of K-Means in one dimension. The classification also provides the automatic SLS threshold 806 used to determine the level of each anomaly. Thus, in various examples, SLS is a linear regression-based anomaly detection algorithm that processes data using one or more sliding windows 802.

SLS is used in various examples to detect unusually high change velocity within the sliding window 802 regardless of the existence of a seasonal pattern in counter values. In some examples, the higher alert sensitivity, generally the more anomalies are reported for the same sample data.

As discussed herein, one or more parameters are adjustable. In a preset mode, the parameters are adjusted automatically with the alert sensitivity setting (e.g., predefined settings). In a custom mode, parameters can be configured manually, including adjusting the threshold 806. Another example parameter includes lag 808, which is the period of time (Time-To-Detection) that it takes a user to confirm that the data is abnormal. For example, lag=7 indicates 7 minutes Time-To-Detection. As another example, the threshold parameter 806 is an SLS threshold that is the counter value. As still another example, a zoom parameter 810 is the time granularity of counter samples. In one example, the default zoom is 1 minute, which is shown as 00:01:00 (hh:mm:ss). It should be noted that the custom mode can be initiated using a custom input 812 (e.g., user input button).

An additional data chart 814 is also displayed in some examples (e.g., at the bottom of an alert creation page) and shows the SLS threshold 816 and the SLS score of the corresponding parameter setting. Wherever the SLS score exceeds the SLS threshold 816, an anomaly is detected and the corresponding region in the counter chart is highlighted (e.g., colored) in some examples.

It should be noted that the user input sensitivity element 410 (shown in FIG. 4) is embodied as a slider bar 818 in FIG. 8. A user is able to drag the sensitivity setting using the slider bar 818 to change the sensitivity of the anomaly detection to be performed. For example, when the sensitivity setting is changed, the underlying parameters used by the selected algorithm to detect anomalies are changed to be more sensitive or less sensitive. That is, more or less anomalies are detected, which can be easily fine-tuned by trying different settings along the slider bar 818. Additionally, a train algorithm user input 820 is selectable to train the algorithm as described in more detail herein.

Thus, in various examples, an adaptive SLS is provided that uses SLS, which also takes into account the history of residual scores obtained from the sliding window 802 in order to determine the predicted threshold (from exponential smoothing of these scores) that needs to be applied to current residual score. If the current residual score exceeds the predicted threshold multiplied by a tolerance, the incoming point (on which the residual score is calculated) is classified as an anomaly. This extension of SLS allows the algorithm to be made adaptive with no manual process in determining the threshold. The SLS implementation is useful, for example, for online processing of large datasets to detect anomalies. Since the exponential smoothing keeps track of the prior residual scores, this algorithm is also useful, for example, in detection of anomalies on data that keeps changing (is dynamic).

3. Percentage Change

Example Target Scenario:

Detects un-expected changes in the average value of a counter.

Example Technique:

Arithmetic.

In various examples, a percent change alert takes all of the points for a time window (e.g., 30 minutes), averages the values together, and compares the result to the same sized time window at some offset in the past (e.g., 24 hours ago, or 1 week ago). The alert is activated if the change in these average values as a percentage of the first value is greater than a configured threshold. For example, if a counter has an average value a week ago of 50, and the current value is 55, the percent change is 10%. If an alert is set to activate on a 5% change with the week offset, the alert is activated. When setting up the alert, a chart with the counter data shows both the current data of the counter, as well as the data at the offset (e.g. one week ago or one day ago). A secondary chart shows the derived percent change of the average value of the counter over time, as well as the overlaid threshold(s). The alert activates when the percent change exceeds one of the thresholds. The region where this occurs will additionally be highlighted on the primary chart.

It should be appreciated that percent change is a simple and intuitive way to look for unexpected changes in the average value of a counter when compared to a same value in the past.

In a preset mode, when training the algorithm, the algorithm simulates various thresholds and offsets. Values to the left of the sensitivity bar correspond to increasing negative thresholds, corresponding to alerts if the value of the counter drops. Values to the right of the sensitivity bar correspond to increasingly positive thresholds, corresponding to alerts if the value of the counter increases. Different sensitivities have different offsets in some examples, such that changing the sensitivity bar can cause the secondary chart's data to change significantly as the percent change is comparing data from distinct prior time periods.

One or more parameters are adjustable in various examples, such as an evaluation parameter that defines the amount of time in which values are averaged. Another example parameter is a max delta, which is the value for which, if the percent change is higher than the value, the alert activates. In one example, the max delta value is a percent represented as a number between 0 and 1.

Another example parameter includes a min delta, which is the value for which, if the percent change is lower than the value, the alert activates. In one example, the min delta value is a percent represented as a number between 0 and −1, correspond to a drop in the average value of the counter. Still another example parameter is an offset, which is the offset of the time periods being compared. The format in one example is [d.]hh:mm:ss, where d=days.

OPERATING EXAMPLES

Figure 9:
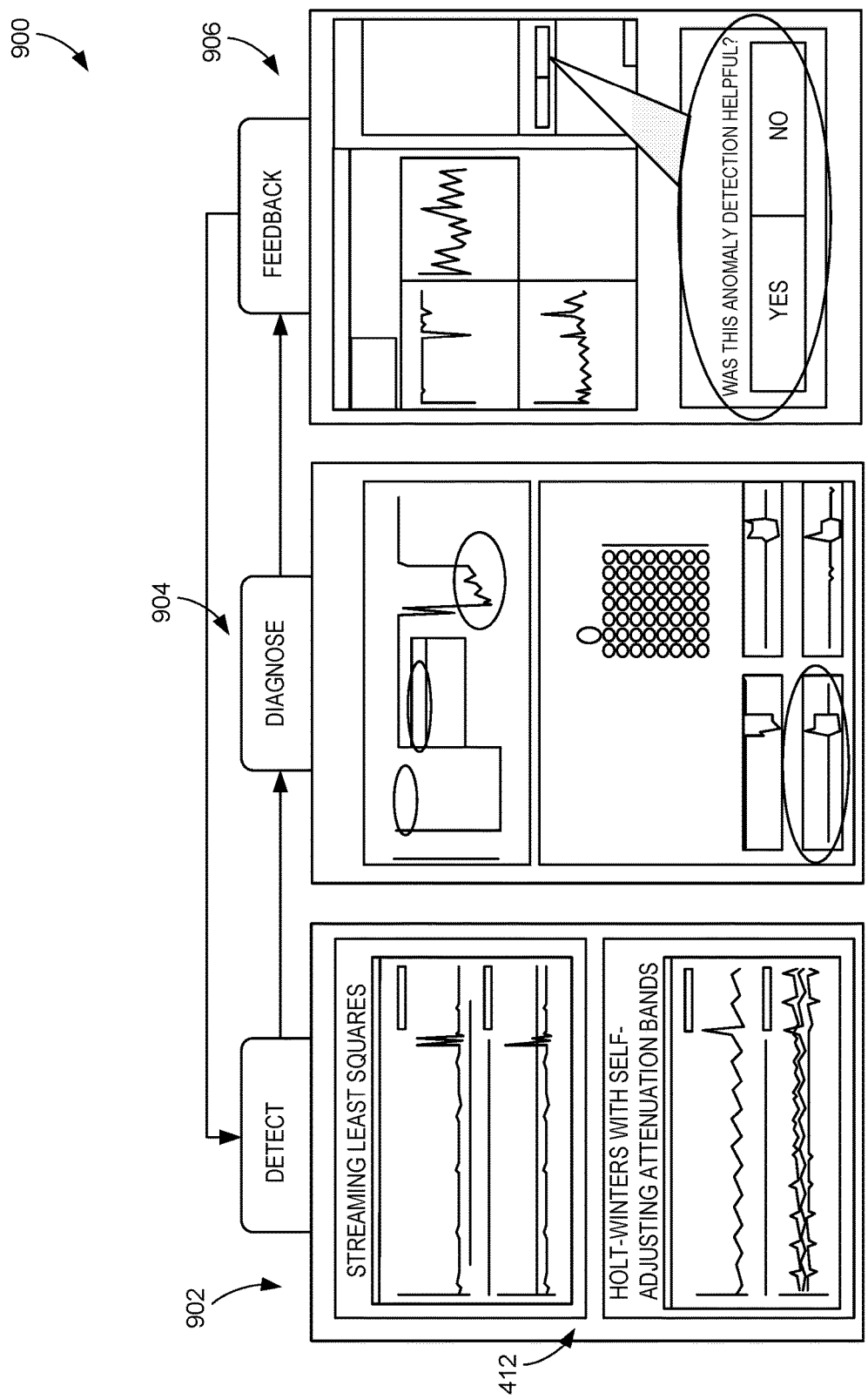
FIG. 9 illustrates an operational flow for anomaly detection in accordance with various examples disclosed herein.

An example operational flow 900 for anomaly detection is illustrated in FIG. 9. In the illustrated example, the operational flow 900 includes detection at 902, diagnosing at 904, and feedback at 906. As described herein, one or more algorithms 412 are recommended and selected for use in anomaly detection. The results can be diagnosed at 904. For example, the results can be reviewed to determine different characteristics, such as correlated sibling or children anomalies, finding outlier detections, and latency, among others.

Some other examples include an anomaly alert with pivot support as follows:

Alert on anomaly in:

Total

Children

Pivot

Enabling Scenario:

Detecting anomaly that only exists in children and a specific combination of pivot.

Reduce investigation scope.

Figure 10:
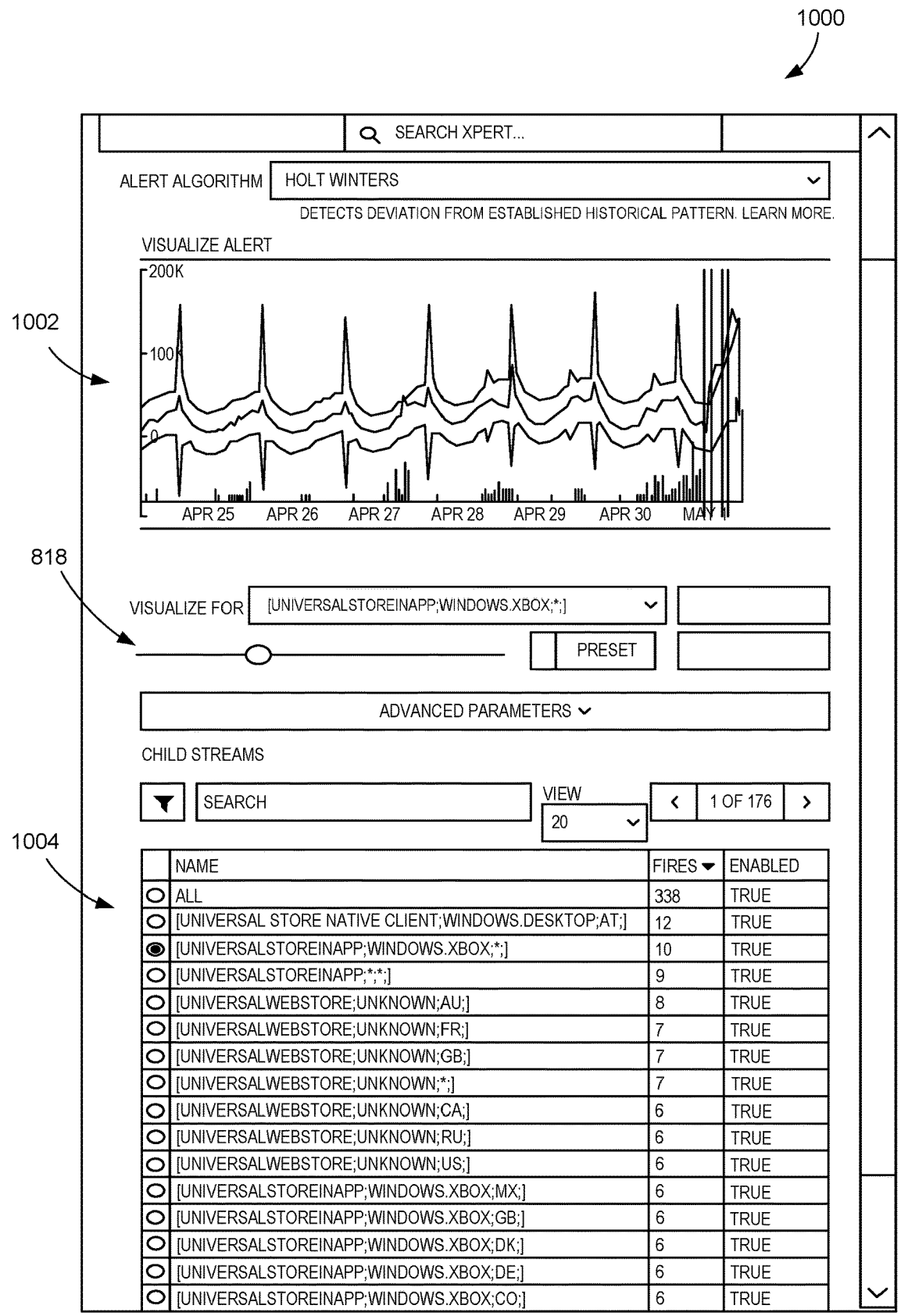
FIG. 10 illustrates a user interface in accordance with various examples disclosed herein.
Figure 11:
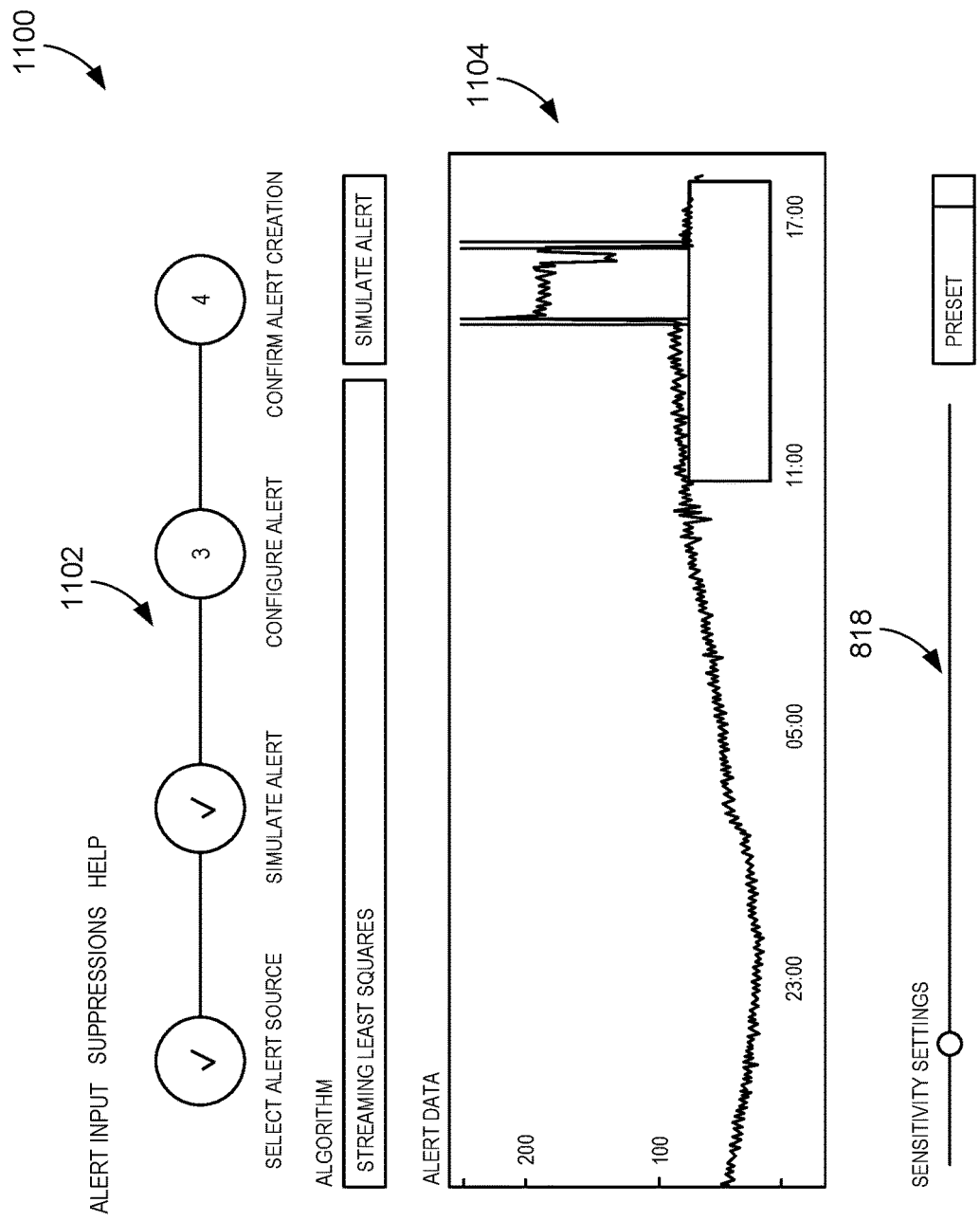
FIG. 11 illustrates a user interface in accordance with various examples disclosed herein.

Feedback operations are then performed at 906. For example, a user input is received regarding whether the particular detected anomaly was helpful. In some examples, details regarding the detected anomaly are displayed, including a reliability and latency for the detection, among other information. The determination of whether the detected anomaly was helpful can be based on different factors, such as business type, application, data type, timing, etc. As such, settings can be adjusted, such as a tolerance threshold. Thus, in various examples, alert visualization is provided, such as with a user interface 1000 as illustrated in FIG. 10. In the illustrated example, an alert chart 1002 is displayed that shows the results of the anomaly detection (e.g., number of alerts and date of alert) as described herein. Additionally, in the illustrated example, the advanced parameters include searchable fields 1004 that can be enabled or disabled.

The present disclosure can be implemented in different applications and operating environments. One example includes a payment application with service health monitoring as follows:

Focus: Payment.

Tool: Anomaly Detection Alert.

Use case: Monitors latency and request rate.

In various examples, the monitoring is more than an incremental enhancement. The present disclosure enables, for example, users (e.g., engineers) to setup alerts for counters which are otherwise hard to define thresholds. In some examples, a user interface 1100 defines a multi-step anomaly detection setup process 1102. For example, the process includes selecting an alert source, simulating the alert, configuring the alert, and confirming the alert confirmation. The user interface 1100 includes an alert data chart 1104 that allows for visualization of the alert data as described herein.

Another example includes a storefront application with service health monitoring as follows:
Focus: StoreFront.
Tool: Anomaly Detection Alert with Table Support and Diagnosis Tools.
Use case:
Monitor service and deployment health;
Performance run evaluation; and
Post-detection diagnosis.
The monitoring can be enabled on one or more services. Example scenarios include:
Scenario I—Intelligent Deployment and Service Health Monitoring
Problem: Hard to define static tolerance threshold.
Tools Used:
Anomaly detection with seasonality adaptation.
Correlation scan.
Result:
Detected early signal of Service 1 incidents through monitoring of request rate.
Identified problematic datacenter.
One particular example mitigates a service 1 outage.
Scenario II—Performance Test Investigation
Problem: sparse data and large dimensionality
Tools used:
Anomaly detection.
Correlation scan.
Result:
Detect anomaly in metric with sparse data.
Identify metrics that correlated to the anomaly instantly.

One example includes an algorithm recommender. As should be appreciated, some algorithms perform better than other algorithms based on the type of workload. The algorithm recommender in some examples is "boot strapped" with recommendations based on expert's knowledge and crowd sourced to users, who have options to experiment with different algorithms and choose an algorithm that works best for the workload. Over time, signals of algorithms selection and matching workload characteristics are collected and analyzed to optimize algorithm and algorithm recommendation in some examples.

Some examples include diagnosis tools to support post-detection analysis, such as machine outlier detection and anomaly correlation analysis. Additionally, the various examples can be implemented into different systems, such as integrated into an Xpert system, which is the data analytics platform for the Asimov data system supporting 4,000+ services and monitoring Windows® devices.

Thus, various anomaly detection alert algorithms can be used as described herein:
Holt-Winters (modified): detects deviation from established historical pattern.
SLS (adaptive): detects unusually high change velocity within sliding window.
Percentage Change: detects relative change in average value between current and trailing sliding windows.

Thus, various examples are configured to perform online anomaly detection and diagnosis.

In various examples, sensitivity mapping is performed, which is the mapping of sensitivity of an algorithm (that detects anomalies in a given data) to a range between (0,1) that is controlled by the slider bar 818 (e.g., virtual slider bar). In the case where the sensitivity is 0, the algorithm is least sensitive and only extreme outliers/anomalies are detected. In the case where the sensitivity is 1, the algorithm is most sensitive and all possible anomalies are detected. As a result, more alerts are activated at this sensitivity level.

In order to determine this sensitivity mapping, an approach is used in various examples by which the threshold is determined looking at decreasing residual values of the training data. The following is one example:

| Sensitivity Value | Threshold |
|---|---|
| 0.5 (default): | Use the threshold obtained by the algorithm |
| 0.5-0.8: | Use a linear mapping obtained from the 99 percentile of the data (obtained from box plot) to 95 percentile (2 sigma) of the data to. |
| 0.8-1: | Use an exponential decrease from 95 percentile to 88 percentile (determined using sigma analysis). |
| 0.5-0.2: | Use the same linear curve obtained from the mapping of (0.5-0.8) above. |
| 0-0.2: | Use an exponential increase from to 20 times the value of the threshold obtained at 0.2 |

Figure 12:
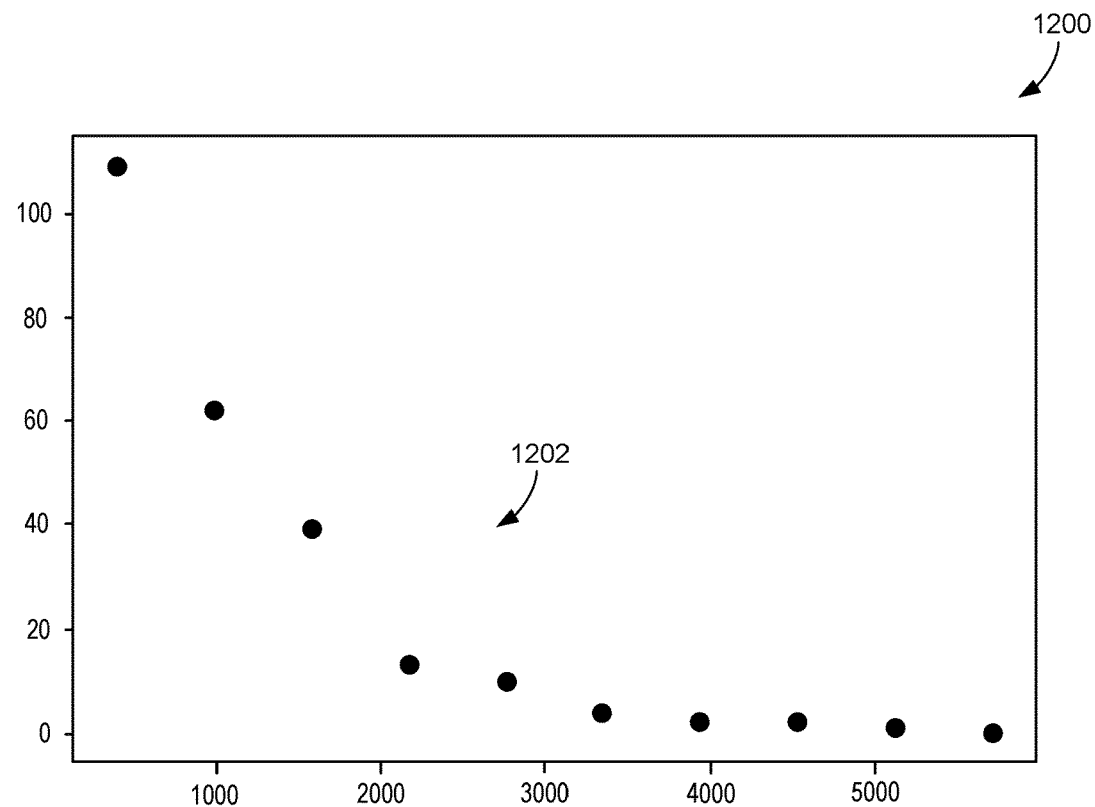
FIG. 12 is graph of data to be processed for anomaly detection in accordance with various examples disclosed herein.
Figure 13:
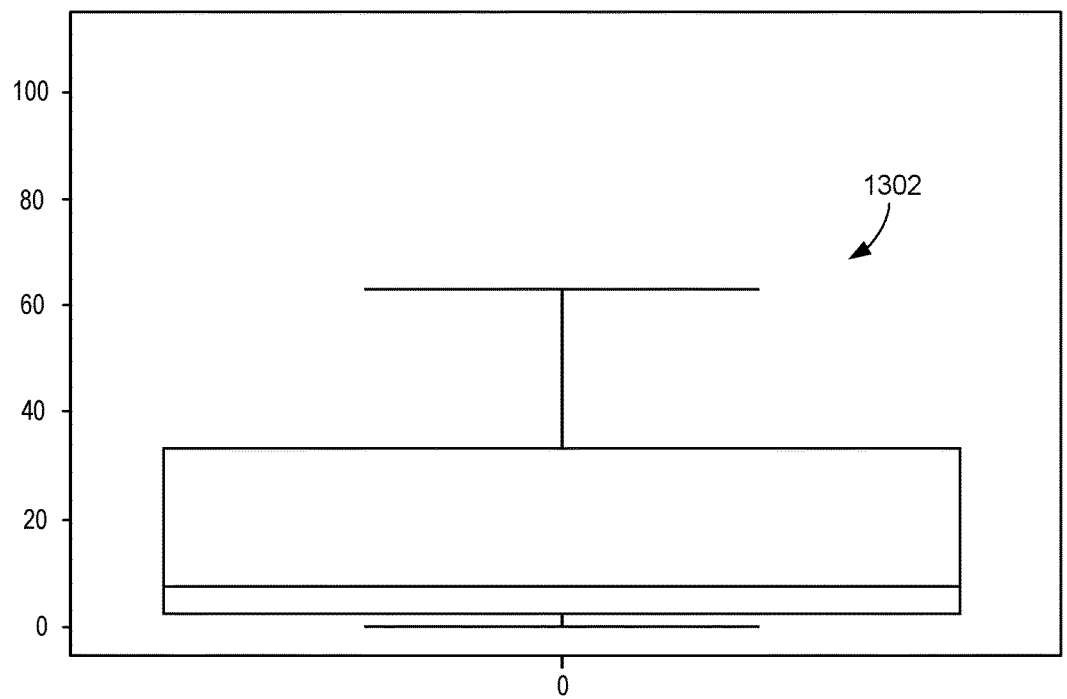
FIG. 13 is a graph of a box plot corresponding to the processing of the data in FIG. 12 in accordance with various examples disclosed herein.
Figure 14:
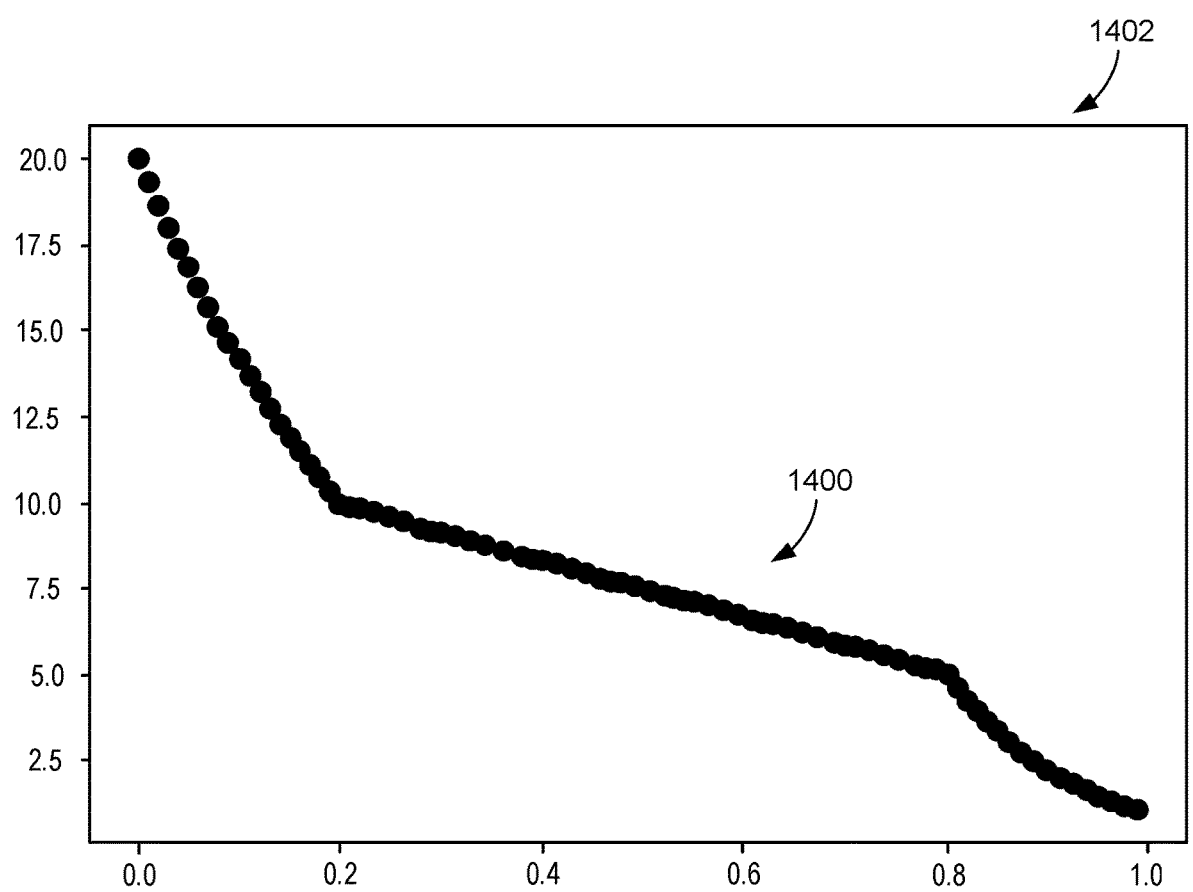
FIG. 14 is a graph of a sensitivity mapping function in accordance with various examples disclosed herein.

An example graph 1200 of sample data 1202 is shown in FIG. 12 and an example box plot 1300 is shown in the graph 1300. An example sensitivity mapping function 1400 of decreasing order of residuals is shown in the graph 1402. As can be seen, since the sensitivity function fits the data, it should be appreciated that this function is robust to changes in the nature of the data.

Thus, various examples provide online anomaly detection for time series data at scale. Some examples include one or more of the following:

1. Algorithm recommendation: Because it can be difficult to identify or find an algorithm that works best for all different type of workload (exp. reliability, latency, and request rate), some examples leverage a collection of anomaly detection algorithms. Algorithm recommendation is provided based on statistical analysis of the targeting workload to pick the algorithm that suits the workload in some examples.

2. Sensitivity bar: Each algorithm has multiple parameters. Algorithm tuning involves understanding of the algorithm and the parameters. Various examples, as described herein, include a sensitivity bar to make the alert calibration/parameter tuning experience as easy as the sensitivity bar.

3. Sensitivity mapping: Sensitivity mapping is performed to map an anomaly degree with corresponding parameter settings to a sensitivity score based on statistical analysis of data distribution of the counter to normalize the sensitivity range for different counters using the same algorithm.

4. Adaptivity SLS algorithm: An enhanced version of the SLS algorithm to enable the algorithm to handle sparse and large data.

In various examples, the algorithm recommender and post-detection analysis, and then a feedback loop, improves the system over time.

Figure 15:
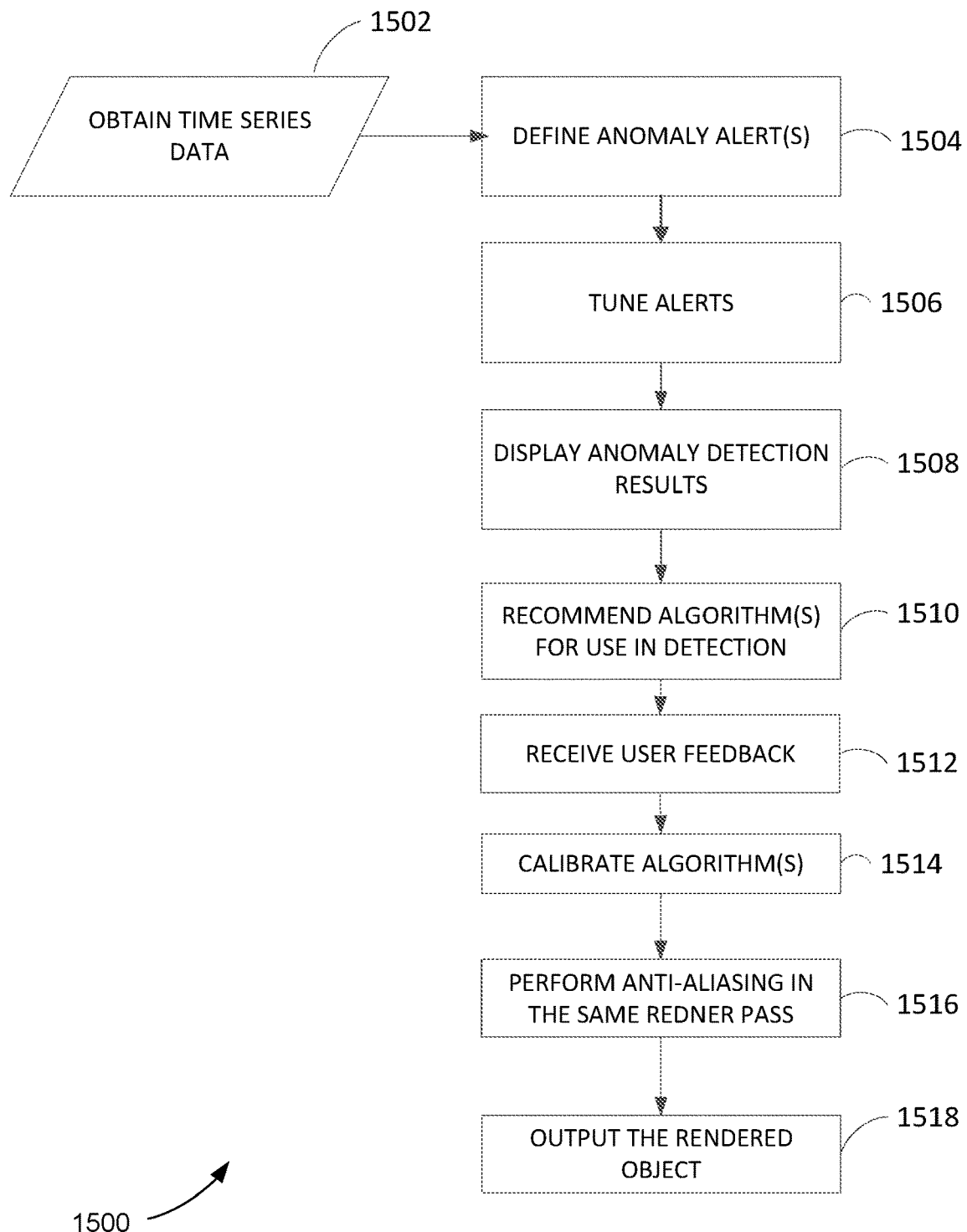
FIG. 15 is a flowchart of method for implementing anomaly detection in accordance with various examples disclosed herein.

FIG. 15 is a flowchart of a method 1500 for implementing anomaly detection according to some of the various examples disclosed herein. It should be noted that the steps of the method 1500 can be performed in a different order, can be combined or divided. Additionally, the steps can be performed simultaneously, concurrently, or sequentially. Additional steps can be added and one or more removed.

The method 1500 beings at 1502 where time series data is obtained (e.g., the time series data 408), such as by the anomaly detection module 316. The time series data can be any data on which anomaly detection is to be performed. One or more anomaly alerts are defined at 1504 as determined, for example, by the alert setup component 402. The alerts are then tuned at 1506, such as based on one or more user inputs or feedback as described herein. In one example, the user input is received at a user input sensitivity element, such as the slider bar 818, which defines a sensitivity for one or more algorithms of a plurality of anomaly detection algorithms. The change in sensitivity, changes a corresponding sensitivity mapping by automatically changing one or more parameters for the one or more algorithms. For example, the different parameters for a selected anomaly detection algorithm are adjusted (e.g., values of variables, etc.) The anomaly detection results based on a change to the user input sensitivity element are displayed at 1508, such as simulation results based on the adjusted sensitivity. For example, one or more graphs are displayed as described herein that visualize the detected anomalies in the time series data. The above-described steps allow a user to easily adjust the sensitivity of the anomaly detection and are performed in some examples during a training process for the particular algorithm. The process can be repeated for different ones of the algorithms described herein. As should be appreciated, any parameters, variables, components, etc. can be changed as a result of an adjustment to the sensitivity setting.

One or more algorithms of the plurality of anomaly detection algorithms to process time series data to detect one or more anomalies are automatically recommended at 1510. For example, the plurality of anomaly detection algorithms are trained in part using iterative learning using feedback including data relating to user input of previous selections of one or more algorithms of the plurality of anomaly detection algorithms. One or more the trained algorithms are then recommended for processing the time series data, such as based on the type of data, amount of data, and anomalies to be detected, among other criteria. It should be noted that the automatic recommendation can be performed based on different criteria, such as based at least in part on a type of workload related to the time series data and processing the time series data is performed using a statistical analysis of a targeting workload.

In some examples, data is collected to update the algorithm recommender, wherein the collected data includes at least selections of algorithms by one or more users. An alert for the one or more anomalies identified in the time series data is then generated based on one of a total data stream, a child data stream, or a pivot combination of data streams. Collected signals of a plurality of user selected anomaly detection algorithms is analyzed and the user selected algorithms matched to workload characteristics over time to optimize an algorithm recommendation. The algorithm recommendation is updated in some examples using a crowdsourcing algorithm.

An anomaly detection algorithm is recommended in some examples based on a statistical analysis of a targeting workload using one or more factors, wherein the one or more factors comprise at least one of reliability, latency, and request rate. The statistical analysis includes collecting data relating to user behavior and using the collected data to recommend the one or more anomaly detection algorithms in some examples, including using historical data.

In some examples, an alert threshold is set based at least in part on decreasing residual values of a set of training data.

User feedback is received at 1512 and one or more of the algorithms are calibrated at 1514. For example, user feedback is received at the post-detection analysis component 406 and the one or more algorithms of the plurality of anomaly detection algorithms are calibrated based at least in part on the received user feedback. The received user feedback in some examples includes labeled data received by the alert annotation component 404 used to train the one or more algorithms using machine learning. For example, as described herein, an iterative feedback learning process can be used to train the algorithms. In some examples, assisted parameter tuning for a detected anomaly alert and calibration of the detected anomaly alert for an updated anomaly alert setting is performed based on one or more retained algorithms of the plurality of anomaly detection algorithms.

The one or more algorithms tuned, recommended, and/or trained by the method 1500 can include one or more of the algorithms described herein, or other suitable algorithms. In one example, the plurality of anomaly detection algorithms comprises a Holt-Winters seasonal forecasting algorithm configured to predict a range of monitored data based on a historical distribution, an adaptive SLS algorithm configured to adaptively adjust warning thresholds for anomaly detection based at least on historical data, and a percent change algorithm configured to process points for a defined time window using average values corresponding to the points.

Additionally, a slider bar is displayed in some examples as the user input sensitivity element that is used to tune one or more of the plurality of anomaly detection algorithms during one or more simulations. A result of the one or more simulations corresponding to different sensitivity settings received at the slider bar are displayed as results graphs that visualize one or more detected anomalies as described herein. In some examples, the slider bar defines a sensitivity range from 0 to 1 to determine a threshold for anomaly alert as follows: (i) a sensitivity value of 0.5 being a default value, wherein the threshold is defined by the algorithm, (ii) a sensitivity value of 0.5-0.8, wherein the threshold is defined by a linear mapping based on a 99 percentile of the data from a box plot to a 95 percentile of two sigma of the data, (iii) a sensitivity value of 0.8-1, wherein the threshold is defined by an exponential decrease from 95 percentile to 88 percentile determined using sigma analysis, (iv) a sensitivity value of 0.5-0.2, wherein the threshold is defined by a same linear curve obtained from the mapping of 0.5-0.8, and (v) 0-0.2, wherein the threshold is defined by an exponential increase from 0 to 20 times a value of a threshold obtained at 0.2.

In some examples, the single slider element receives a user input to adjust an alert setting for one or more of the anomaly detection algorithms, and performs sensitivity mapping to map an anomaly degree with corresponding parameter settings to a sensitivity score based on statistical analysis of data distribution of a plurality of counters to normalize a sensitivity range for different ones of the plurality of counters using a same algorithm based on a setting of the single slider element. Anomaly detection auto-calibration is performed in some examples for multiple pivots (e.g., pivot points in the graphs) using the single slider element to set a sensitivity for the one or more algorithms.

The method 1500 in some examples displays a parameters selection component including a plurality of adjustable parameters configurable based on a user input, wherein the plurality of adjustable parameters change the processing of the time series data to detect the one or more anomalies.

Figure 16:
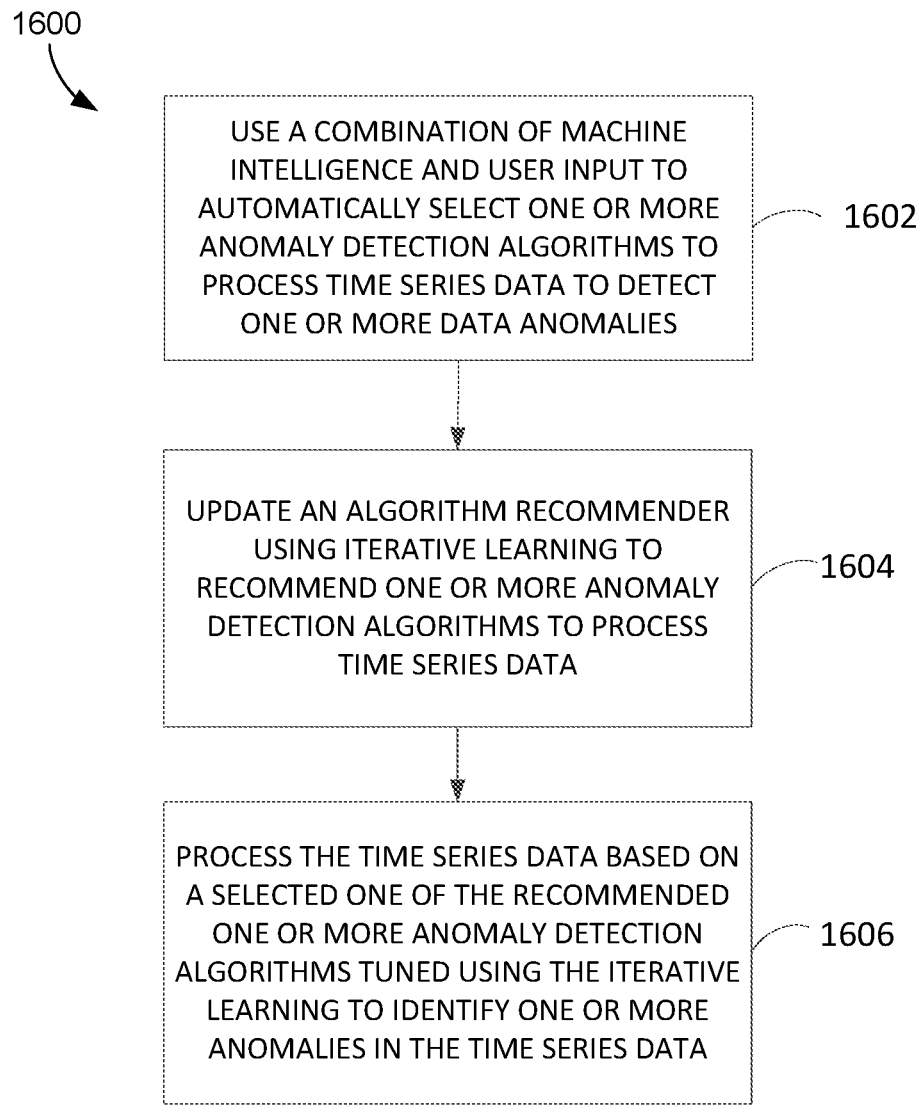
FIG. 16 is a flowchart of method for implementing anomaly detection in accordance with various examples disclosed herein.

FIG. 16 is a flowchart of a method 1600 for implementing anomaly detection according to some of the various examples disclosed herein. The method 1600 includes using a combination of machine intelligence and user input (human input) to automatically select one or more anomaly detection algorithms to process time series data to detect one or more data anomalies at 1602. In one example, the one or more anomaly detection algorithms comprises the Holt-Winters seasonal forecasting algorithm configured to predict a range of monitored data based on a historical distribution, the adaptive SLS algorithm configured to adaptively adjust warning thresholds for anomaly detection based at least on historical data, and the percent change algorithm configured to process points for a defined time window using average values corresponding to the points.

The method 1600 includes updating an algorithm recommender at 1604 using iterative learning to recommend one or more anomaly detection algorithms to process time series data. As described herein, various inputs and feedback can be used.

The method 1600 also includes processing the time series data based on a selected one of the recommended one or more anomaly detection algorithms tuned using the iterative learning to identify one or more anomalies in the time series data at 1604. For example, a detection sensitivity is adjusted in some examples.

With respect to the algorithms, the Holt-Winters seasonal forecasting algorithm is configured in some examples to process the time series data using a plurality of seasonal bands, including using band attenuation to detect a divergence from one or more regular season patterns. In some examples, the Holt-Winters seasonal forecasting algorithm is configured to compute average errors at each point in a seasonal cycle, wherein an exponential smoothing is applied to an array of errors that is indexed using a Holt-Winters seasons table. Different alpha coefficients are used in response to (i) a new error being above a previous smoothed average and (ii) the new error being below the previous smoothed average. In some examples, the Holt-Winters seasonal forecasting algorithm, upon starting processing of a new series of received time series data, is configured to use adjusted weights to initialize seasons as an approximate average of all seasons. The Holt-Winters seasonal forecasting algorithm, upon starting processing of a new series of time series data, is configured to use a polynomial curve fitting to detrend a first season of the new series of time series data in some examples. The Holt-Winters seasonal forecasting algorithm is configured to weight a more recent history of time series data higher than a less recent history of time series data in both a prediction and an estimation of error in some examples.

In some examples, the adaptive SLS algorithm is configured to use an OLS and compute a regression residual, wherein the regression residual defines an SLS score that is an anomaly for a defined time window of the received time series data. In some examples, the results of the adaptive SLS algorithm are sorted by the SLS score and classified into a plurality of levels, wherein the plurality of levels are defined such that that anomalies in a same level have similar scores. Automatic SLS thresholding is thereby used to determine the level of each anomaly. One or more parameters of the adaptive SLS algorithm are automatically adjusted with an alert sensitivity setting received from a user. The one or more parameters include at least one of a lag time defined by a period of time for a user to confirm that data is abnormal, an SLS threshold defined by a counter value, and a zoom parameter defining a time granularity of one or more counter samples as described herein. The adaptive SLS algorithm in some examples is configured to use a history of residual scores obtained from the sliding window to determine a predicted threshold from exponential smoothing of the history of residual scores, and applied to a current residual score. In response to the current residual score exceeding the predicted threshold multiplied by a tolerance, an incoming data point on which the residual score is calculated is classified as an anomaly.

In some examples, the percent change algorithm is configured to compare a result of an averaging to a same sized time window at an offset in a previous time period, and an anomaly alert is activated if a change in the average values as a percentage of a first value is greater than a defined threshold. One or more parameters of the percent change algorithm are adjustable, including at least one of an evaluation parameter that defines an amount of time in which values are averaged, a maximum delta value that defines a value for which, if a percent change is higher than the value, an alert activates, and a minimum delta, which is a value for which, if the percent change is lower than the value, an alert activates.

In some examples, sensitivity mapping is performed to map an anomaly degree with corresponding parameter settings to a sensitivity score based on a statistical analysis of data distribution of a counter to normalize a sensitivity range for different counters using a same anomaly detection algorithm. A received a user input defines one or more alerts corresponding to the different counters and that define alert thresholds. An anomaly alert is provided with table support in some examples by identifying any children or contributing children applications when anomalies were detected and that contributed to a change in an alert pattern.

Exemplary Operating Environment

The present disclosure is operable with a computing apparatus according. In one example, components of the computing apparatus may be implemented as a part of an electronic device according to one or more embodiments described in this specification. The computing apparatus comprises one or more processors which may be microprocessors, controllers or any other suitable type of processors for processing computer executable instructions to control the operation of the electronic device. Platform software comprising an operating system or any other suitable platform software may be provided on the apparatus to enable application software to be executed on the device. According to an embodiment, anomaly detection may be accomplished by software.

Computer executable instructions may be provided using any computer-readable media that are accessible by the computing apparatus. Computer-readable media may include, for example, computer storage media such as a memory and communications media. Computer storage media, such as the memory, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory) is shown within the computing apparatus, it will be appreciated by a person skilled in the art, that the storage may be distributed or located remotely and accessed via a network or other communication link (e.g. using a communication interface).

The computing apparatus may comprise an input/output controller configured to output information to one or more input devices and output devices, for example a display or a speaker, which may be separate from or integral to the electronic device. The input/output controller may also be configured to receive and process an input from the one or more input devices, for example, a keyboard, a microphone or a touchpad. In one embodiment, the output device may also act as the input device. An example of such a device may be a touch sensitive display. The input/output controller may also output data to devices other than the output device, e.g. a locally connected printing device. In some embodiments, a user may provide input to the input device(s) and/or receive output from the output device(s).

In some examples, the computing apparatus detects voice input, user gestures or other user actions and provides a natural user interface (NUI). This user input may be used to author electronic ink, view content, select ink controls, play videos with electronic ink overlays and for other purposes. The input/output controller outputs data to devices other than a display device in some examples, e.g. a locally connected printing device.

NUI technology enables a user to interact with the computing apparatus 302 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus is configured by the program code when executed by the processor(s) to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A system for anomaly detection, the system comprising:

a memory area associated with a computing device, the memory area including an algorithm recommender component, an alert setup component, an alert annotation component, and a post-detection analysis component; and a processor that executes the algorithm recommender component, the alert setup component, the alert annotation component, and the post-detection analysis component to:

define one or more anomaly alerts determined by the alert setup component and tuned based on a user input received at a user input sensitivity element, the user input sensitivity element adjustable to define a sensitivity for one or more algorithms of a plurality of anomaly detection algorithms to change a corresponding sensitivity mapping by automatically changing one or more parameters for the one or more algorithms, and displaying anomaly detection results of a change to the user input sensitivity element;

automatically recommend, by the algorithm recommender component, one or more algorithms of the plurality of anomaly detection algorithms to process time series data to detect one or more anomalies, the plurality of anomaly detection algorithms trained in part using iterative learning using feedback including data relating to user input of previous selections of one or more algorithms of the plurality of anomaly detection algorithms; and receive user feedback at the post-detection analysis component and calibrating one or more algorithms of the plurality of anomaly detection algorithms based at least in part on the received user feedback, the received user feedback including labeled data received by the alert annotation component used to train the one or more algorithms using machine learning.

Other examples include:

A computerized method for data anomaly detection, the computerized method comprising:

using a combination of machine intelligence and human input to automatically select one or more anomaly detection algorithms to process time series data to detect one or more data anomalies, wherein the one or more anomaly detection algorithms comprises a Holt-Winters seasonal forecasting algorithm configured to predict a range of monitored data based on a historical distribution, an adaptive Streaming Least Square (SLS) algorithm configured to adaptively adjust warning thresholds for anomaly detection based at least on historical data, and a percent change algorithm configured to process points for a defined time window using average values corresponding to the points;

updating an algorithm recommender using iterative learning to recommend one or more anomaly detection algorithms to process time series data; and processing the time series data based on a selected one of the recommended one or more anomaly detection algorithms tuned using the iterative learning to identify one or more anomalies in the time series data.

Other examples include:

One or more computer storage media having computer-executable instructions to perform anomaly detection that, upon execution by a processor, cause the processor to at least:

define one or more anomaly alerts determined by the alert setup component and tuned based on a user input received at a user input sensitivity element, the user input sensitivity element adjustable to define a sensitivity for one or more algorithms of a plurality of anomaly detection algorithms to change a corresponding sensitivity mapping by automatically changing one or more parameters for the one or more algorithms, and displaying anomaly detection results of a change to the user input sensitivity element;

automatically recommend, by the algorithm recommender component, one or more algorithms of the plurality of anomaly detection algorithms to process time series data to detect one or more anomalies, the plurality of anomaly detection algorithms trained in part using iterative learning using feedback including data relating to user input of previous selections of one or more algorithms of the plurality of anomaly detection algorithms; and receive user feedback at the post-detection analysis component and calibrating one or more algorithms of the plurality of anomaly detection algorithms based at least in part on the received user feedback, the received user feedback including labeled data received by the alert annotation component used to train the one or more algorithms using machine learning.

Alternatively, or in addition to the examples described above, examples include any combination of the following:

process time series data to recommend the one or more algorithms recommended based at least in part on a type of workload related to the time series data and processing the time series data by performing a statistical analysis of a targeting workload.

perform assisted parameter tuning for a detected anomaly alert and calibration of the detected anomaly alert for an updated anomaly alert setting based on one or more retained algorithms of the plurality of anomaly detection algorithms.

wherein the plurality of anomaly detection algorithms comprises a Holt-Winters seasonal forecasting algorithm configured to predict a range of monitored data based on a historical distribution, an adaptive Streaming Least Square (SLS) algorithm configured to adaptively adjust warning thresholds for anomaly detection based at least on historical data, and a percent change algorithm configured to process points for a defined time window using average values corresponding to the points.

display a slider bar as the user input sensitivity element and an algorithm selection component to select an algorithm of the plurality of anomaly detection algorithms to tune in one or more simulations, wherein a result of the one or more simulations corresponding to different sensitivity settings received at the slider bar are displayed as results graphs that visualize one or more detected anomalies.

wherein the slider bar defines a sensitivity range from 0 to 1 to determine a threshold for anomaly alert as follows: (i) a sensitivity value of 0.5 being a default value, wherein the threshold is defined by the algorithm, (ii) a sensitivity value of 0.5-0.8, wherein the threshold is defined by a linear mapping based on a 99 percentile of the data from a box plot to a 95 percentile of two sigma of the data, (iii) a sensitivity value of 0.8-1, wherein the threshold is defined by an exponential decrease from 95 percentile to 88 percentile determined using sigma analysis, (iv) a sensitivity value of 0.5-0.2, wherein the threshold is defined by a same linear curve obtained from the mapping of 0.5-0.8, and (v) 0-0.2, wherein the threshold is defined by an exponential increase from 0 to 20 times a value of a threshold obtained at 0.2.

display a parameters selection component including a plurality of adjustable parameters configurable based on a user input, wherein the plurality of adjustable parameters change the processing of the time series data to detect the one or more anomalies.

wherein the user input sensitivity element comprises a single slider element, and the processor further executes the alert setup component to receive a user input at the single slider element to adjust an alert setting for one or more of the anomaly detection algorithms, and performs sensitivity mapping to map an anomaly degree with corresponding parameter settings to a sensitivity score based on statistical analysis of data distribution of a plurality of counters to normalize a sensitivity range for different ones of the plurality of counters using a same algorithm based on a setting of the single slider element, wherein anomaly detection auto-calibration is performed for multiple pivots using the single slider element to set a sensitivity for the one or more algorithms.

wherein the user input adjusting the sensitivity bar causes the processor to further execute the alert setup component to change a plurality of parameters used by the one or more of algorithms to process the time series data.

wherein the Holt-Winters seasonal forecasting algorithm is configured to at least one of (i) process the time series data using a plurality of seasonal bands, including using band attenuation to detect a divergence from one or more regular season patterns, or (ii) compute average errors at each point in a seasonal cycle, wherein an exponential smoothing is applied to an array of errors that is indexed using a Holt-Winters seasons table, and different alpha coefficients are used in response to (a) a new error being above a previous smoothed average and (b) the new error being below the previous smoothed average.

wherein the Holt-Winters seasonal forecasting algorithm, upon starting processing of a new series of received time series data, is configured to one of (i) use adjusted weights to initialize seasons as an approximate average of all seasons or (ii) use a polynomial curve fitting to detrend a first season of the new series of time series data.

wherein the Holt-Winters seasonal forecasting algorithm is configured to weight a more recent history of time series data higher than a less recent history of time series data in both a prediction and an estimation of error.

wherein the adaptive SLS algorithm is configured to use an Ordinary Least Squares (OLS) and compute a regression residual, wherein the regression residual defines an SLS score that is an anomaly for a defined time window of the received time series data.

sorting results of the adaptive SLS algorithm by the SLS score and classifying the results into a plurality of levels, wherein the plurality of levels are defined such that that anomalies in a same level have similar scores, such that automatic SLS thresholding is used to determine the level of each anomaly.

automatically adjusting one or more parameters of the adaptive SLS algorithm with an alert sensitivity setting received from a user, the one or more parameters comprising at least one of a lag time defined by a period of time for a user to confirm that data is abnormal, an SLS threshold defined by a counter value, and a zoom parameter defining a time granularity of one or more counter samples.

wherein the adaptive SLS algorithm is configured to use a history of residual scores obtained from a sliding window to determine a predicted threshold from exponential smoothing of the history of residual scores, and applied to a current residual score, and in response to the current residual score exceeding the predicted threshold multiplied by a tolerance, an incoming data point on which the residual score is calculated is classified as an anomaly.

wherein the percent change algorithm is configured to compare a result of an averaging to a same sized time window at an offset in a previous time period, and an anomaly alert is activated if a change in the average values as a percentage of a first value is greater than a defined threshold.

performing sensitivity mapping to map an anomaly degree with corresponding parameter settings to a sensitivity score based on a statistical analysis of data distribution of a counter to normalize a sensitivity range for different counters using a same anomaly detection algorithm, and receiving a user input to define one or more alerts corresponding to the different counters and that define alert thresholds.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors together with the computer program code stored in memory constitute exemplary processing means for data anomaly detection.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a memory area associated with a computing device, the memory area storing a plurality of anomaly detection algorithms and including computer-executable instructions; and
a processor that executes the computer-executable instructions to:
select an anomaly detection algorithm from the plurality of the anomaly detection algorithms based on a type of workload, and process data with the selected anomaly detection algorithm to detect an anomaly;
calibrate the selected anomaly detection algorithm based at least in part on user feedback; and
receive a user input, from a single slider element, to adjust an alert setting for the plurality of anomaly detection algorithms.

2. The system of claim 1, wherein the processor further executes the computer-executable instructions to iteratively train an anomaly detection algorithm from the plurality of the anomaly detection algorithms based at least in part on the user feedback.

3. The system of claim 1, wherein the processor further executes the computer-executable instructions to collect user behavior data for an anomaly detection algorithm from the plurality of the anomaly detection algorithms, wherein the anomaly detection algorithm is automatically recommended based on the collected user behavior data.

4. The system of claim 1, wherein the processor further executes the computer-executable instructions to display a slider bar as a user input sensitivity element and select an algorithm of the plurality of the anomaly detection algorithms to tune in a simulation, wherein a result of the simulation corresponding to a different sensitivity setting received at the slider bar is displayed to visualize the detected anomaly.

5. The system of claim 4, wherein the slider bar is displayed as a user interface (UI) element that allows an adjustment to a sensitivity.

6. The system of claim 1, wherein the processor further executes the computer-executable instructions to update the computer-executable instructions associated with the selected anomaly detection algorithm.

7. The system of claim 6, wherein the computer-executable instructions associated with the selected anomaly detection algorithm are updated using a crowdsourcing algorithm.

8. A computerized method comprising:
selecting an anomaly detection algorithm to process time series data to detect an anomaly;
updating the selected anomaly detection algorithm to another anomaly detection algorithm based on a type of workload to process the time series data;
processing the time series data based on the updated anomaly detection algorithm to identify the anomaly in the time series data; and
displaying a slider bar as a user interface (UI) element that allows an adjustment to a sensitivity for the updated anomaly detection algorithm.

9. The computerized method of claim 8, further comprising:
receiving user feedback for the updated anomaly detection algorithm; and
calibrating the updated anomaly detection algorithm based at least in part on the received user feedback.

10. The computerized method of claim 9, further comprising collecting user behavior data for the updated anomaly detection algorithm, wherein the calibrated and updated anomaly detection algorithm is automatically recommended based on the collected user behavior data.

11. The computerized method of claim 8 further comprising:
predicting a value in the time series data with a seasonal component;
tracking a historical deviation from the predicted value; and
determining a deviation in a newly arriving data point based on the tracking.

12. The computerized method of claim 8, wherein the selected anomaly detection algorithm is updated using a crowdsourcing algorithm.

13. The computerized method of claim 8, further comprising automatically adjusting a parameter of an adaptive Streaming Least Square (SLS) algorithm with an alert sensitivity setting received from a user, the parameter comprising one or more of the following: a lag time defined by a period of time for the user to confirm that data is abnormal, an SLS threshold defined by a counter value, and a zoom parameter defining a time granularity of a counter sample.

14. The computerized method of claim 13, wherein the adaptive SLS algorithm is configured to use a history of residual scores obtained from a sliding window to determine a predicted threshold from exponential smoothing of the history of residual scores, and applied to a current residual score, and in response to the current residual score exceeding the predicted threshold multiplied by a tolerance, an incoming data point on which the residual score is calculated is classified as an anomaly.

15. The computerized method of claim 8, further comprising receiving a user input, from a single slider element, to adjust an alert setting for the anomaly detection algorithm.

16. The computerized method of claim 15, further comprising performing sensitivity mapping to map a percentage variation from an upper bound and a lower bound of an alert threshold with a corresponding parameter setting to a sensitivity score based on a statistical analysis of data distribution of a counter to normalize an upper bound and a lower bound of sensitivity for different counters using a same anomaly detection algorithm based on the received user input from the single slider element.

17. A computer storage medium having computer-executable instructions that, upon execution by a processor, cause the processor to at least:
recommend an anomaly detection algorithm from a plurality of anomaly detection algorithms based on a type of workload, and process data with the recommended anomaly detection algorithm to detect an anomaly;
calibrate the recommended anomaly detection algorithm based at least in part on user feedback;
predict a value in the data with a seasonal component;
track a historical deviation from the predicted value; and
determine a deviation in a newly arriving data point based on the tracked historical deviation.

* * * * *